United States Patent
McKinney et al.

(10) Patent No.: US 10,843,937 B1
(45) Date of Patent: Nov. 24, 2020

(54) WASTEWATER DISINFECTION SYSTEM

(71) Applicants: Jerry L. McKinney, Silsbee, TX (US); Rainer Kuenzel, Hunt, TX (US)

(72) Inventors: Jerry L. McKinney, Silsbee, TX (US); Rainer Kuenzel, Hunt, TX (US)

(73) Assignee: Jerry L. McKinney, Silsbee, TX (US)

( * ) Notice: Subject to any disclaimer, the term of this patent is extended or adjusted under 35 U.S.C. 154(b) by 288 days.

(21) Appl. No.: 15/611,336

(22) Filed: Jun. 1, 2017

Related U.S. Application Data

(60) Provisional application No. 62/344,205, filed on Jun. 1, 2016.

(51) Int. Cl.
| | | |
|---|---|---|
| *C02F 1/00* | (2006.01) | |
| *C02F 3/02* | (2006.01) | |
| *C02F 3/28* | (2006.01) | |
| *C02F 1/50* | (2006.01) | |
| *F16K 31/22* | (2006.01) | |
| *C02F 103/00* | (2006.01) | |

(52) U.S. Cl.
CPC .............. *C02F 1/008* (2013.01); *C02F 1/50* (2013.01); *C02F 3/02* (2013.01); *C02F 3/2866* (2013.01); *F16K 31/22* (2013.01); *C02F 2103/005* (2013.01); *C02F 2201/005* (2013.01); *C02F 2209/40* (2013.01); *C02F 2209/42* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 5,154,353 A | 10/1992 | Plachy | |
| 5,680,989 A | 10/1997 | Plachy et al. | |
| 2003/0036033 A1* | 2/2003 | Chandler | A61C 1/0061 433/77 |
| 2008/0087611 A1* | 4/2008 | Tomley | C02F 1/686 210/749 |
| 2009/0112364 A1* | 4/2009 | Chen | C02F 1/686 700/266 |
| 2009/0218531 A1* | 9/2009 | Gelez | F01L 9/04 251/129.2 |

* cited by examiner

*Primary Examiner* — Richard C Gurtowski
(74) *Attorney, Agent, or Firm* — Bushman Werner, P.C.

(57) ABSTRACT

An apparatus for disinfecting flowing wastewater in a conduit with a liquid disinfectant from a reservoir of liquid disinfectant. A valve assembly is operatively connected to the liquid disinfectant source for selectively dispensing liquid disinfectant from the source. The valve has a movable valve element normally biased to the closed position. There is an actuator connected to the movable valve element which is responsive to at least one of flow or level of wastewater in the conduit to overcome the biasing force and allow the valve member to move the valve from the normally closed position to an open position.

35 Claims, 11 Drawing Sheets

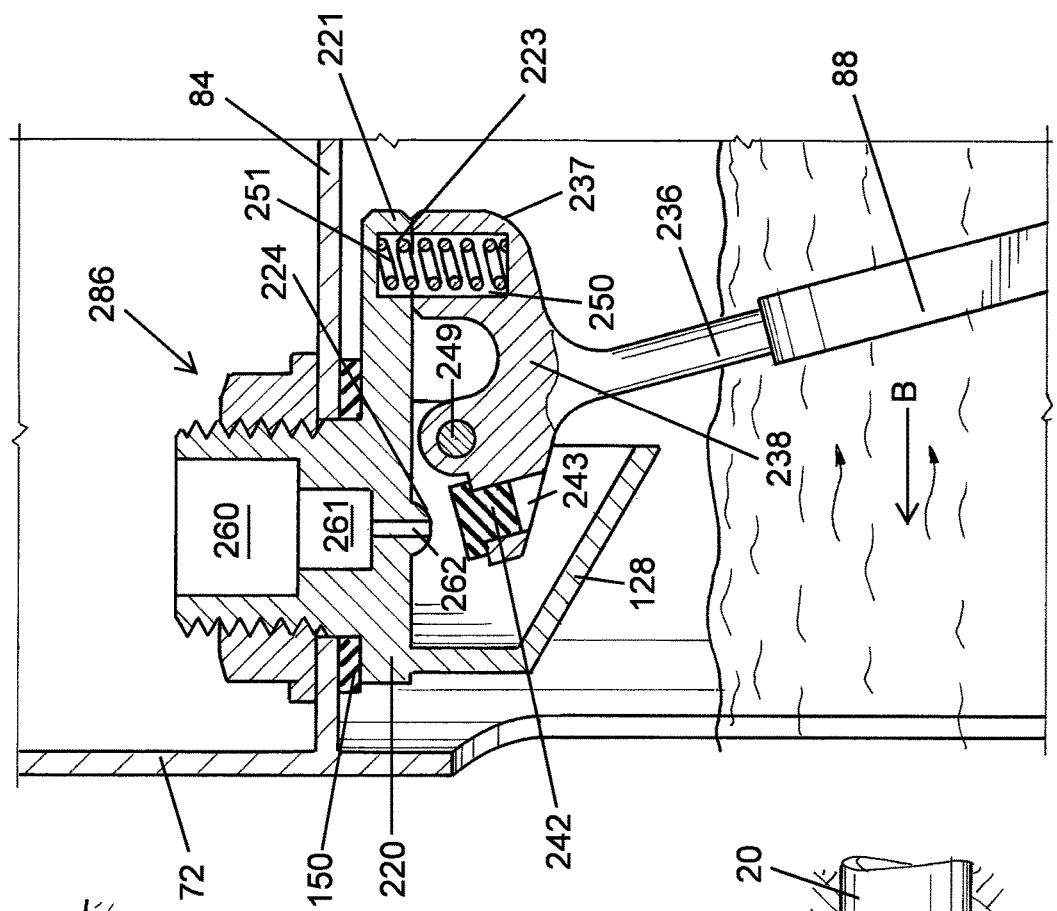
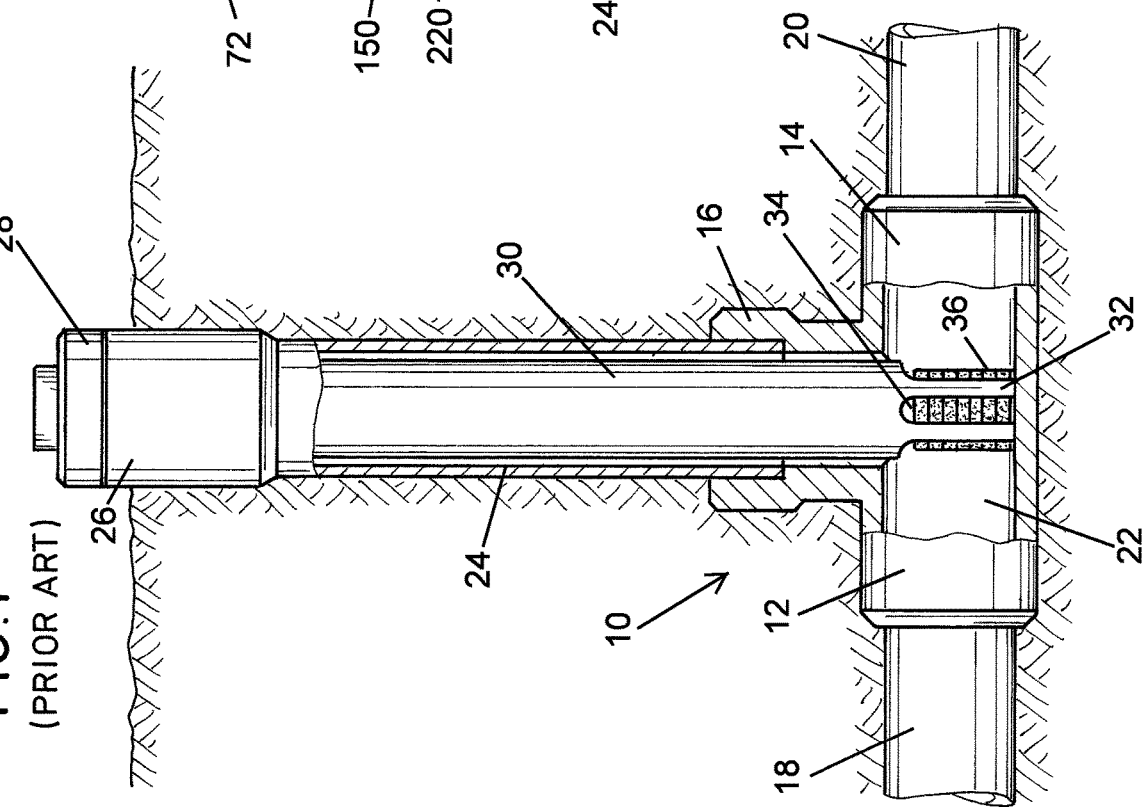
FIG. 6
FIG. 1 (PRIOR ART)

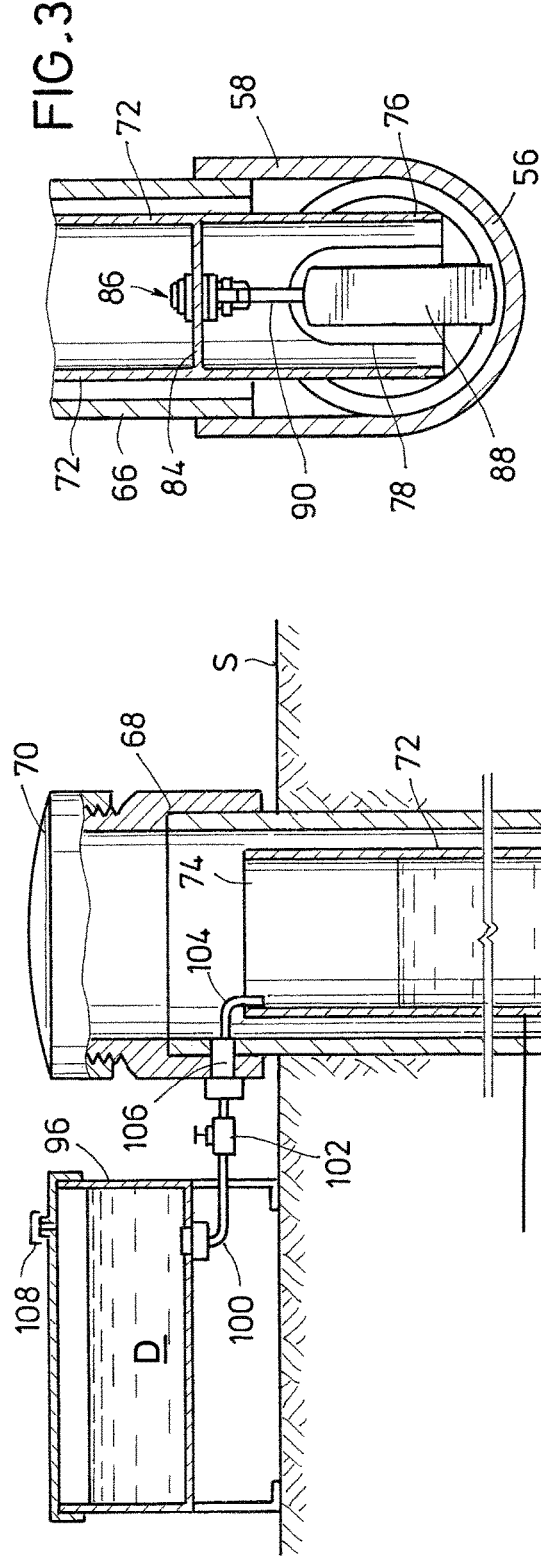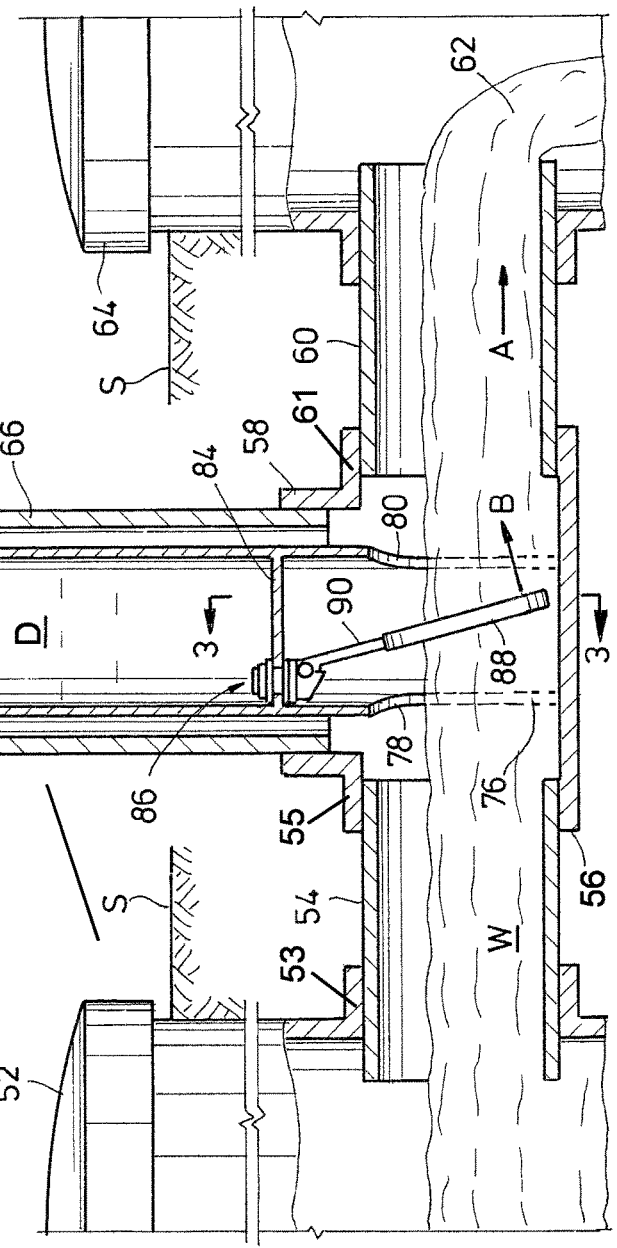

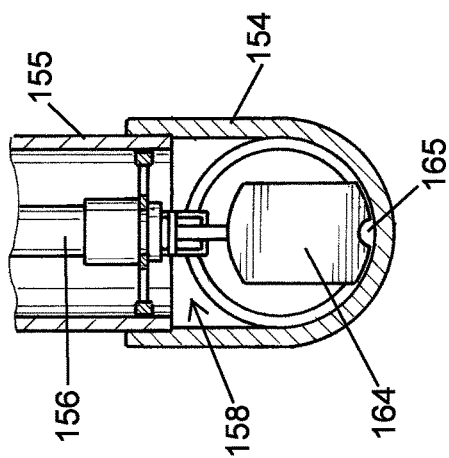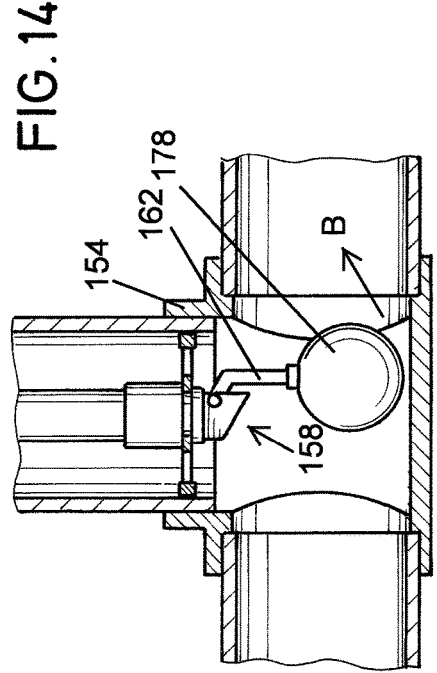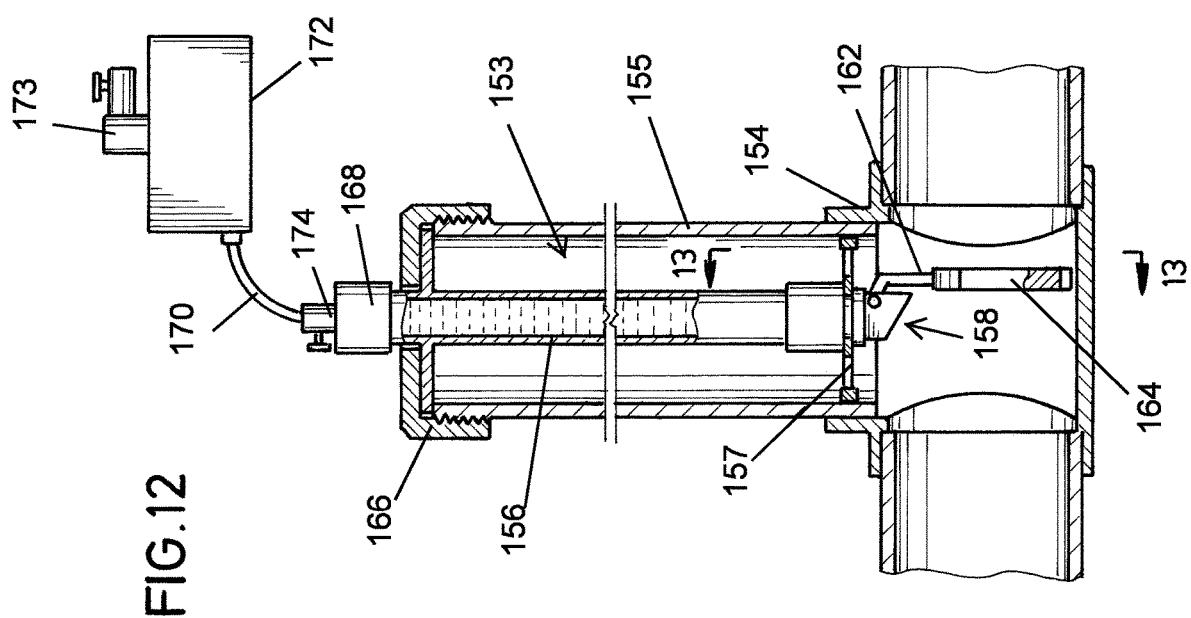

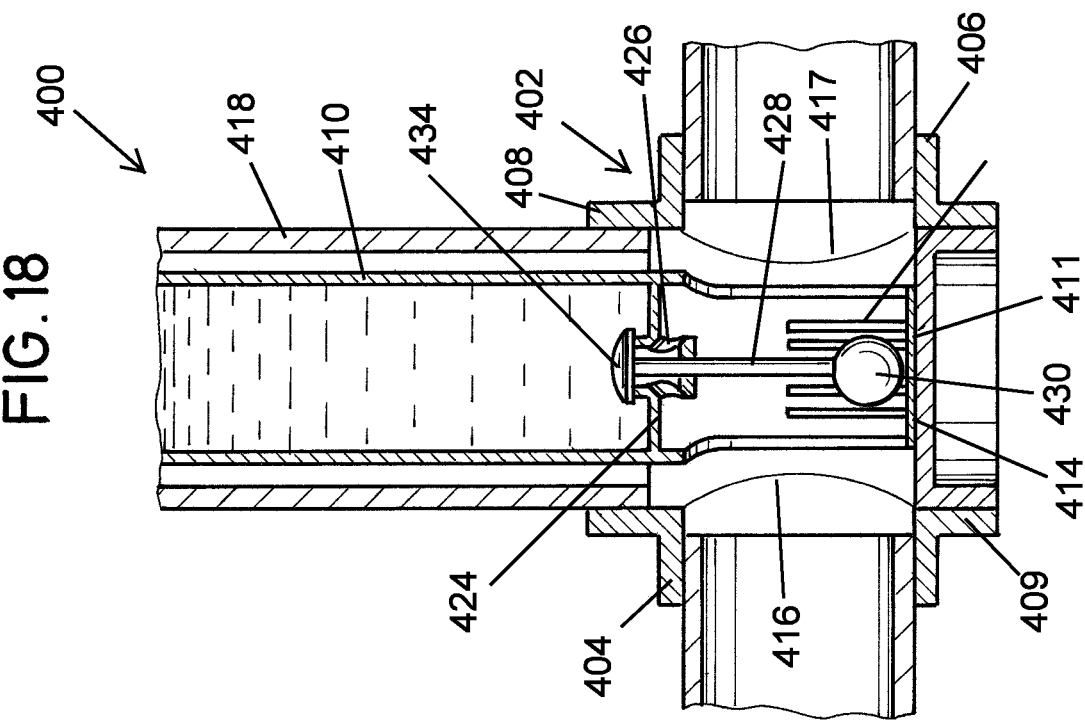
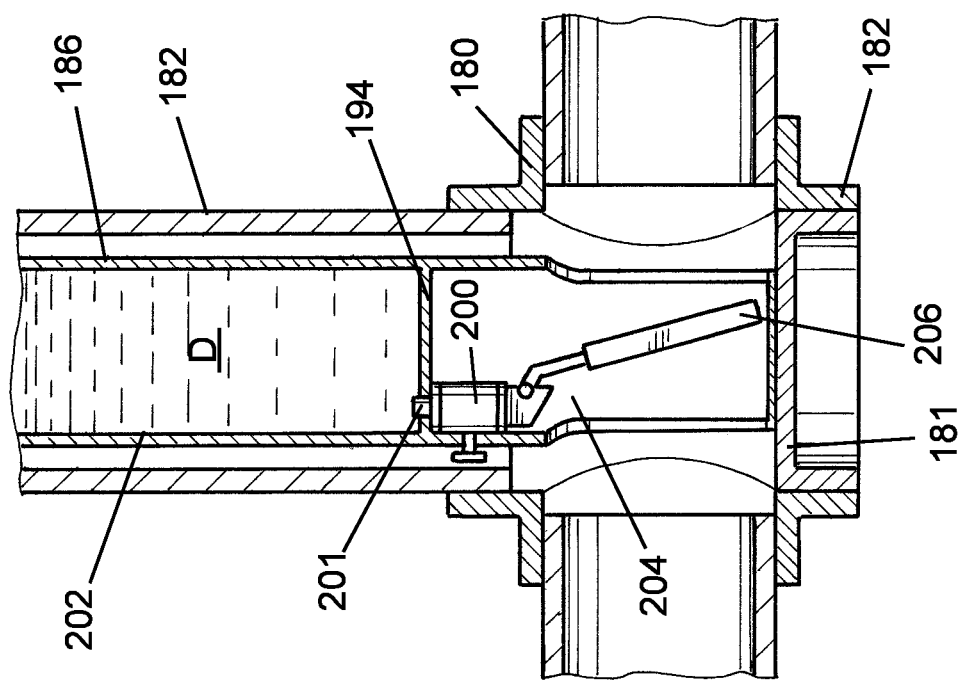

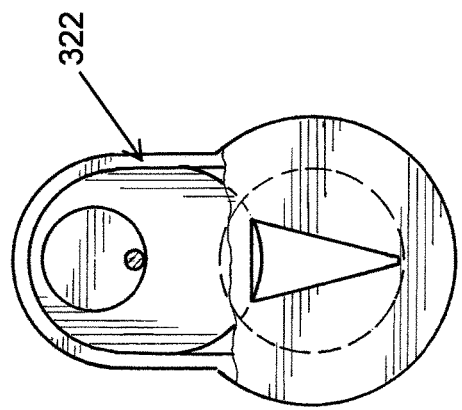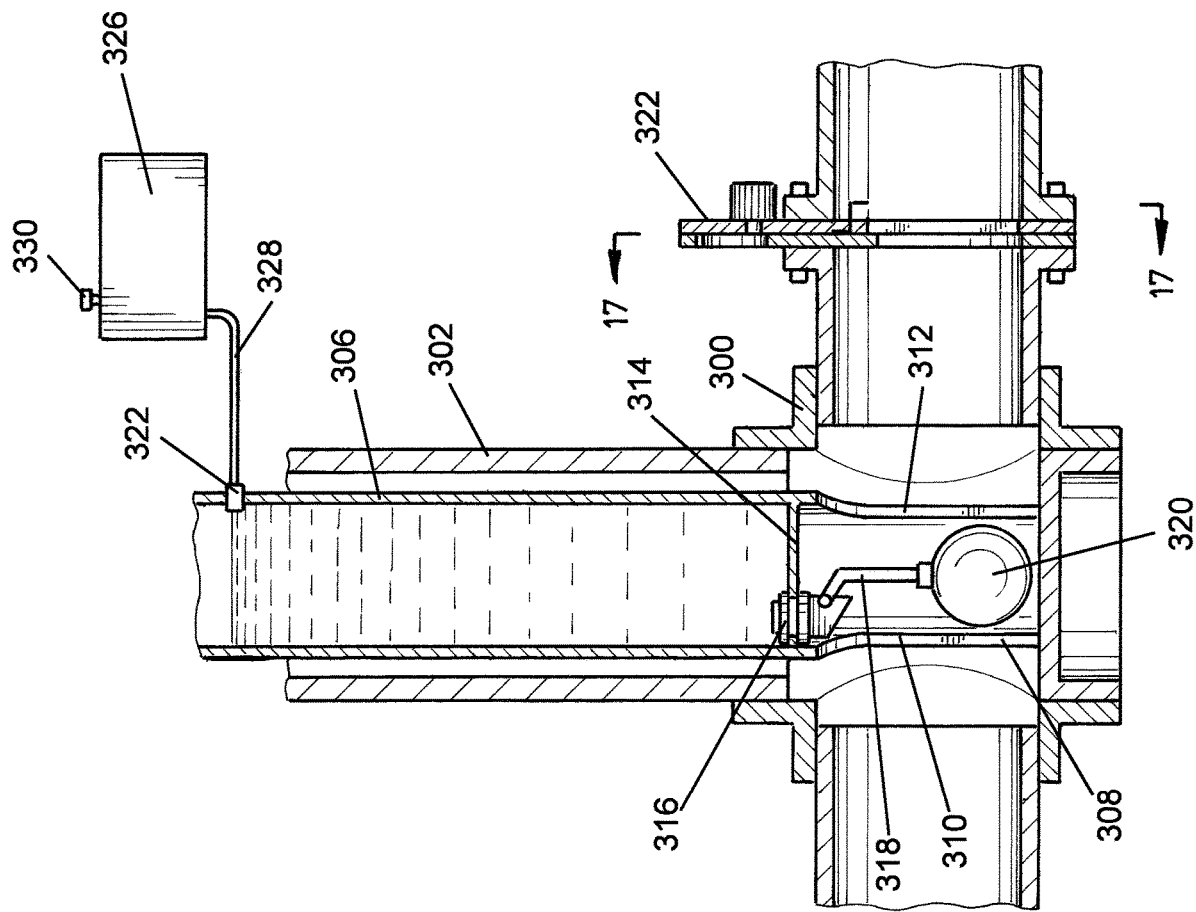

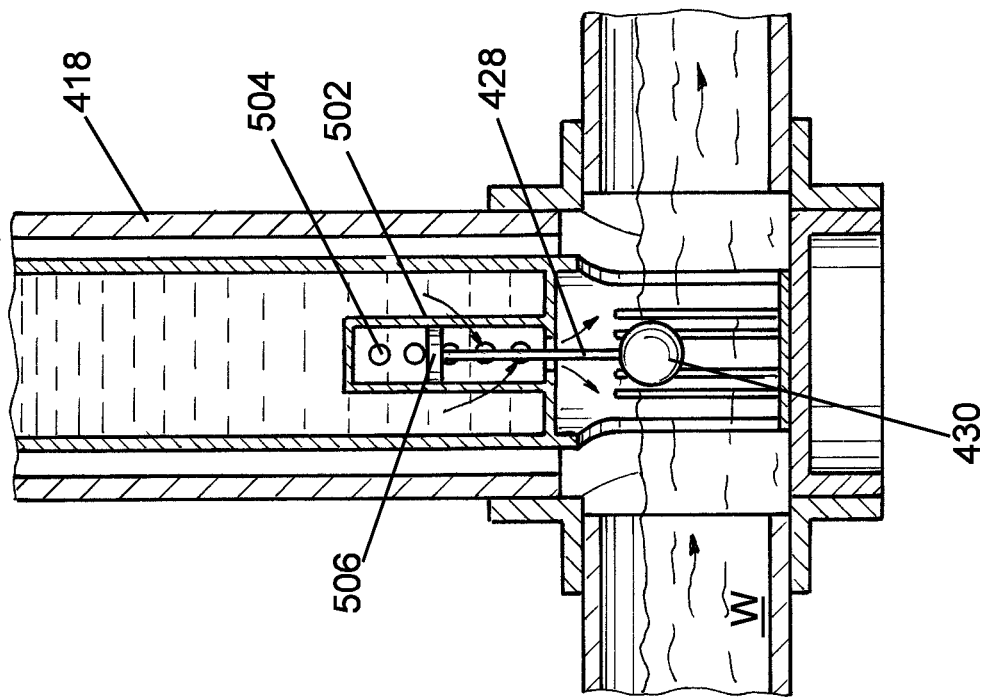
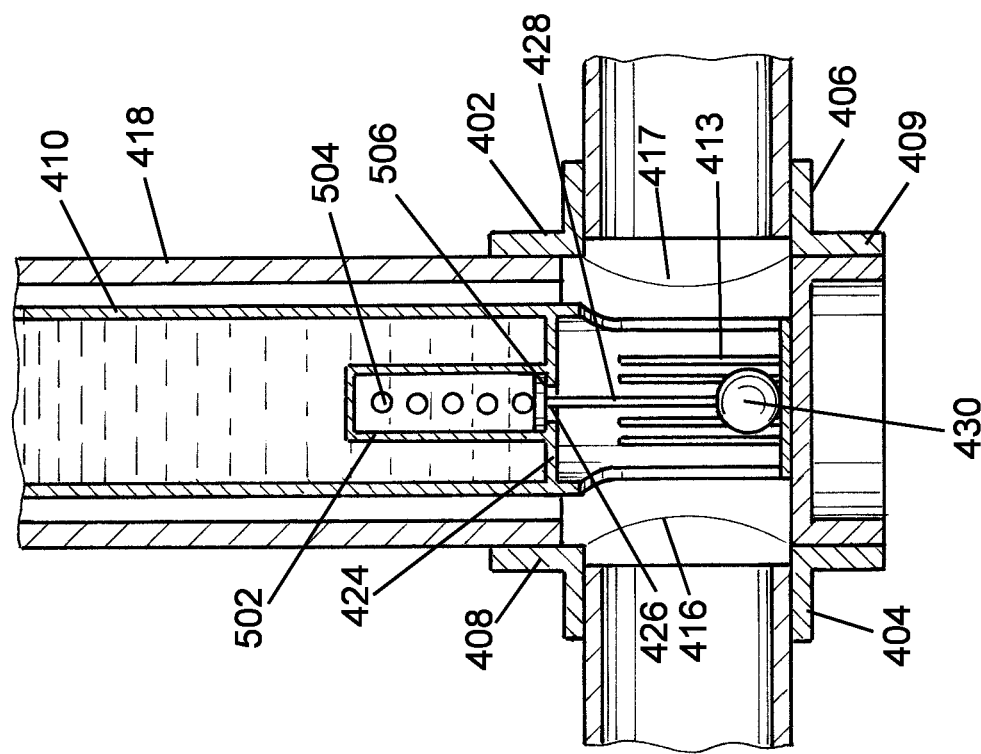

WASTEWATER DISINFECTION SYSTEM

CROSS REFERENCE TO RELATED APPLICATION

This application claims priority to U.S. Application No. 62/344,205 filed on Jun. 1, 2016, the disclosure of which is incorporated herein by reference for all purposes.

FIELD OF THE INVENTION

The present invention relates to wastewater treatment systems, particularly to a system for disinfecting wastewater produced by such wastewater treatment systems.

BACKGROUND OF THE INVENTION

A residential wastewater treatment system is generally comprised of a treatment system which can be an aerobic wastewater treatment system, a septic system, a sand filter, as well as other types of treatment systems and a pump or holding tank for treated wastewater.

A characteristic of these wastewater treatment systems is that raw, untreated wastewater including human waste is treated to remove and/or dissolve most solids and produce a substantially solids free wastewater which must then be disinfected before it can be disposed of into the environment, e.g., by irrigation, discharge to a stream, etc.

For residential or small volume wastewater treatment systems, the most common form of disinfection is by tablet chlorination. A typical wastewater treatment system including a tablet chlorinator of the prior art is shown in FIG. 1. The system shown in FIG. 1 is, as seen, at least partially buried under the ground. With respect to the plumbing, the system includes a T-fitting shown generally as 10, which could be a cross-fitting, but which in any event has a first generally horizontally extending leg 12, a second generally horizontally extending leg 14, and a generally vertically extended leg 16. A pipe 18 carrying partially clarified wastewater from a suitable wastewater treatment plant is connected to leg 12 of T-fitting 10. A second pipe 20 is connected to leg 14, pipe 20 typically being connected to a holding tank, pump tank, or the like. Pipes 18, T-fitting 10, and pipe 20 forming a generally horizontal flow path. The juncture of legs 12, 14, and 16, cooperate to form an internal contact basin or chamber 22 in T-fitting 10. Received in leg 16 of T-fitting 10 is a riser 24, riser 24 having a head portion 26 which extends slightly above grade and is closed off by a threaded cap 28. Received in riser 24 is a cartridge or tube 30. Tube 30 has a lower end 32 in which are formed are plurality of circumferentially spaced, longitudinally extending slots 34. Disposed in the lower end of cartridge or tube 30 are generally disc shaped chlorine tablets 36. In operation, partially clarified wastewater flowing from pipe 18 into T-fitting 10 contacts the chlorine tablets or discs 36 in the contact basin 22, the slots 34 allowing intimate contact between the flowing wastewater and the chlorine tablets. As is well known to those in the art, as the lower most tablet(s) in the cartridge 30 dissolve in the wastewater, succeeding tablets fall by gravity into the lower part of the contact basin 22 and subsequently dissolve as well.

Although tablet chlorinators are ubiquitous in the field of wastewater treatment, they suffer from several disadvantages. For one, the tablets above the contactor can get wet and swell causing the feeder tube to jam. Accordingly, there is no contact of the tablet with the water in the contactor. Furthermore, chlorine tablets are expensive. The tablets can cost up to more than three times as much as an equivalent amount of chlorine that is commercially available in the form of household chlorine bleach. Lastly, handling of the chlorinating tablets is hazardous.

SUMMARY OF THE INVENTION

In one aspect, the present invention relates to a liquid disinfectant apparatus for residential or small volume wastewater systems, e.g., a system handling less than about 10,000 gal/day.

In another aspect, the present invention relates to a liquid disinfectant apparatus for small volume wastewater treatment systems which does not require any electrical connectivity.

In yet another aspect, the present invention relates to a liquid disinfectant apparatus for wastewater treatment systems which can be installed below or above ground level as desired.

In a further aspect, the present invention relates to a liquid disinfectant apparatus which can be retrofitted into an existing tablet chlorinator system.

In another aspect, the present invention relates to a method for dispensing liquid disinfectant into a conduit through which wastewater is/can flow and which uses the level and/or flow of wastewater in the conduit, a gravitational flow of liquid disinfectant, and requires no electrical connectivity.

In still a further aspect, the present invention relates to a method of converting a wastewater treatment system which utilizes solid chlorine tables with a wastewater disinfectant system which utilizes a liquid disinfectant.

These and further features and advantages of the present invention will become apparent from the following detailed description, wherein reference is made to the figures in the accompanying drawings.

BRIEF DESCRIPTION OF THE DRAWINGS

FIG. 1 is a prior art system for disinfecting wastewater employing a tablet chlorinator.

FIG. 2 is an elevational view, partly in section, of one embodiment of the disinfecting apparatus of the present invention.

FIG. 3 is a view taken along the lines 3-3 of FIG. 2.

FIG. 6 is a view similar to FIG. 5, wherein the valve assembly is spring biased to the normally closed position.

FIG. 12 is an elevational view, partly in section, showing another embodiment of the disinfecting apparatus of the present invention.

FIG. 13 is a view taken along the lines 13-13 of FIG. 12.

FIG. 14 is a view similar to FIG. 12 showing another type of actuator for use in one embodiment of the disinfecting apparatus of the present invention.

FIG. 15 is an elevational view, partly in section, showing another embodiment of the disinfecting apparatus of the present invention.

FIG. 16 is an elevational view, partly in section, showing another embodiment of the disinfecting apparatus of the present invention.

FIG. 17 is a cross-sectional view taken along the lines 17-17 of FIG. 16.

FIG. 18 is an elevational view, partly in section, showing another embodiment of the disinfecting apparatus of the present invention.

FIG. 19 is an elevational view, partly in section, showing another embodiment of the disinfecting apparatus of the present invention.

FIG. 20 is a view similar to FIG. 19 showing the operation of the valve assembly in response to flowing wastewater.

DETAILED DESCRIPTION OF PREFERRED EMBODIMENTS

Figure 4:
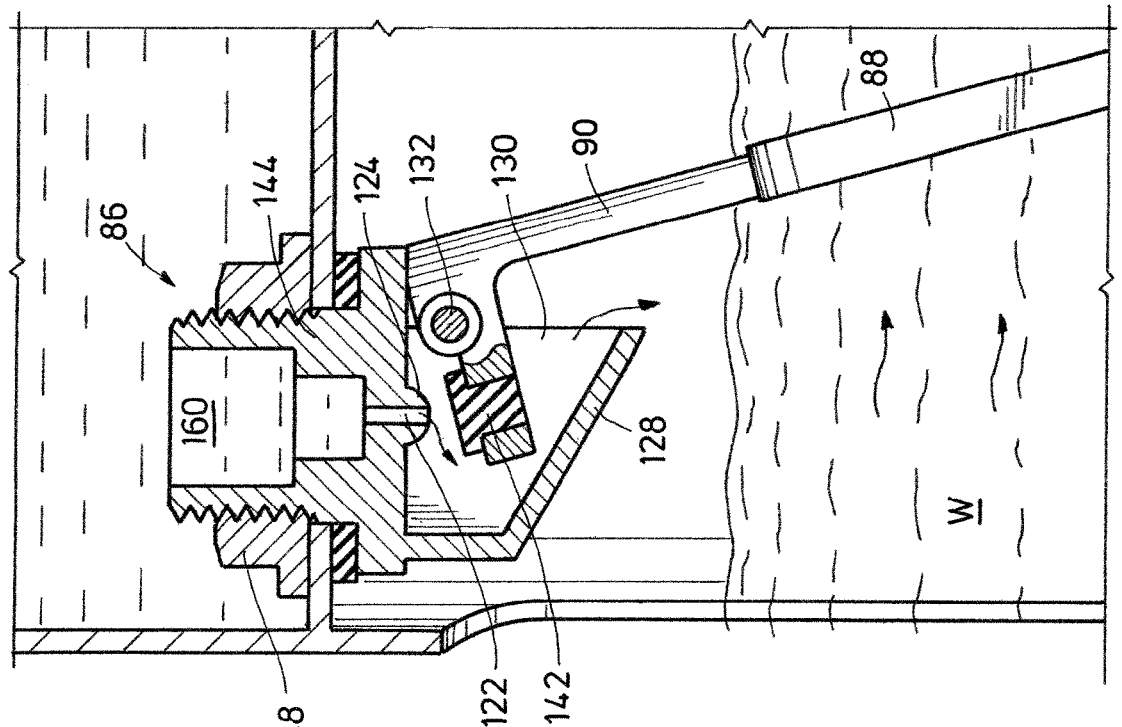
FIG. 4 is an elevational view, partly in section, showing an enlargement of a portion of a valve assembly used in the embodiment of FIG. 2 with the valve in a closed position.

In general, the apparatus of the present invention, is based, in part, on gravitational flow of a liquid disinfectant from a first upper position to a second lower position, e.g., from a reservoir, container, tank, chamber or the like containing liquid disinfectant and located at a first higher level to a point, e.g., the inlet of a valve, positioned at a second, lower level.

The valve assemblies useful in the apparatus of the present invention, are those having an inlet, an outlet, and a movable valve member which can be biased, e.g., by gravity, a spring, etc., to operatively engage the outlet and maintain the valve in a normally closed position, thereby normally preventing flow through the valve assembly. Virtually any valve which can be oriented such that there is a flow path from an inlet to an outlet, the inlet being above the outlet such that a liquid can flow by gravity from the inlet to the outlet, the valve having a movable valve member which can operatively engage the outlet, is useful in the apparatus of the present invention.

The actuators used in the apparatus of the present invention include any component or assembly of components which is/are/can be operatively connected to a movable valve member and which can be disposed, at least partly, in a conduit or the like through which wastewater can flow, a sufficient level or flow of wastewater in the conduit acting to move the actuator, e.g., in a vertical or lateral direction, causing the valve member to move from the normally closed position to an open position and allow flow through the valve assembly.

The term "support" as used herein and with particular respect to the valve assembly includes any structure, formation, or assembly of components on or to which the valve assembly can rest, be connected, be held, be positioned, or be disposed, preferably in a stationary state.

In the description which follows, the terms "vertical," "vertically disposed," "up," and "down" and similar terms, are used in a manner to describe orientation relative to the earth's surface and are with respect to how the apparatus/system/method would be oriented while in use. Thus, spatially relative terms such as "vertical," "vertically disposed," "beneath," "lower," "upper," and the like are used with respect to the apparatus and method of the present invention to describe the apparatus/method when it is used for its intended purpose, e.g., disinfecting wastewater. Thus, the apparatus/system/method of the present invention can have any spatial orientation prior to installation, e.g., during manufacture, shipping, before installation, etc.

Further, the term "vertical" or any variant thereof is not intended to mean a perpendicular orientation with respect to horizontal, e.g., the earth's surface. Rather, the term "vertical" and variants thereof includes any angular relation between a point A and a point B whereby a liquid will flow by gravity from point A to point B.

The term "operatively connected" is defined broadly herein to mean any direct or indirect, fixed or adjustable connection, of one part to another for purposes of achieving operability of the two parts in a given environment.

The term "operatively engaged" is defined broadly to mean any direct or indirect contact between two parts for purposes of operating the two parts in a given environment. By example only, if a valve member is operatively engaged with a valve outlet, flow can be controlled, e.g., allowed or prevented, through the valve outlet The term "partially treated wastewater" "clarified wastewater," or "substantially solids free" and similar terms are intended to mean wastewater which has been subjected to a primary treatment for the removal of floating and settling solids through sedimentation or otherwise. Thus, overflow water from a septic tank, from a clarifier in an aerobic wastewater treatment system, from a filter type system, etc. can be considered to be clarified wastewater or partially treated wastewater. In general, any sewage stream which has been treated in any way to minimize floating and/or settling solids can be considered partially treated wastewater or clarified wastewater.

As shown by the description and claims, the apparatus of the present invention may be described with respect to a valve assembly being "above" a generally vertically upwardly facing aperture in a conduit, fitting or other vessel-like structure. It is contemplated that although the valve assembly is described as being above the aperture, it could be inside the aperture, the only proviso being that it is not sufficiently in the aperture in the receptacle (pipe, fitting, or the like) that it is deleteriously effected by the level or flow of wastewater in the receptacle.

In one preferred embodiment, the valve assembly of the present invention can be an on-off valve, as opposed to a valve which can be throttled to some intermediate position between fully open and fully closed. However, it is to be recognized that although the valve assembly may be substantially of the on-off type, some minimal throttling occurs as the valve moves from the open to the closed position and vice versa. Stated differently, in one embodiment, and preferably, a valve assembly for use in the apparatus of the present invention is designed to shut completely off and to fully open with no ability to be regulated effectively through the range of travel.

It will be appreciated that like parts shown in different embodiments may be numbered with like numbers.

Turning first to FIGS. 2 and 3, there is shown a treatment tank 52 which can be part of an aerobic wastewater treatment plant, a septic system, or any other type of wastewater treatment system wherein substantially clarified wastewater is produced. Then tank 52 is intended to represent any wastewater treatment facility or part thereof wherein there is produced a substantially clarified wastewater and includes media filtered systems, sand filtered systems, membrane technology systems, etc. Tank 52 has an outlet 53 which is connected by conduit 54 to a leg 55 of T-fitting 56, one leg 58 of which is oriented generally vertically upwardly. There is a second conduit 60 connected to leg 61 of T-fitting 56, conduit 60 being connected to the inlet 62 of a pump tank or holding tank 64. While tanks 52 and 64 are shown as being buried beneath the surface S of the ground, it will be understood, as seen hereafter, that the tanks can be above ground. Furthermore, it will be appreciated that in most cases, and as shown, the upper portions of tanks 52 and 64 would be slightly above or at grade. Thus, conventionally tanks 52 and 64 would have their upper ends at or slightly above ground level with an access hatch such that any internal equipment in the tanks could be serviced.

Connected to vertically upwardly extending leg 58 of T-fitting 56 is a riser 66, riser 66 being connected to a head fitting 68, a threaded cap 70 being threadedly received on fitting 68.

Removably disposed in riser 66 is a cartridge 72 having an uppermost open end 74 and a lowermost open end 76. Again it will be understood that, in use and as shown in FIG. 2, riser 66 and cartridge 72 are generally vertically disposed and in the embodiment shown in FIG. 2 extend from the ground surface S to a lower T-fitting 56. At its lowermost end 76, cartridge 72 has first and second diametrically disposed windows 78 and 80 which, as seen in FIG. 3, are generally arch shaped when viewed in elevation effectively forming legs which, as seen in FIG. 2, engage the inner wall of T-fitting 56 on the lower side. As can also be seen, windows 78 and 80 are generally aligned with the flow path formed by conduits 54 and 60. In the preferred case, and when a cartridge such as cartridge 72 is employed, it is preferred that the lower end of the cartridge be provided with legs, formations or the like which extend into the T-fitting, conduit, or the like, in which the lower end of the cartridge is positioned so as to engage a wall of the T-fitting, conduit, or the like, such that, preferably, the cartridge need not be "suspended" at a higher position. However, it is to be understood that the present invention contemplates a cartridge, or any liquid delivery system which can be suspended in a riser such that the lower end of the cartridge is above the lower wall of the T-fitting, conduit or the like.

Disposed generally horizontally in cartridge 72 proximal end 76 is a plate 84. Mounted or supported on plate 84 is a valve assembly 86 described more fully hereafter. The valve assembly 86 is connected to a paddle 88 by arm 90 for a purpose described below.

Cartridge 72 contains a volume of a liquid disinfectant D which is in open communication with valve 86. A line 100 is connected to a control valve 102 which in turn is connected to a line 104 which in turn passes through a fitting 106 in a hole formed in the wall of fitting 68. There is a cap 108 which serves as a combination cover and adjustable air vent. As is well known to those skilled in the art, the adjustable air vent can take many different forms, e.g., a hole, a valve, etc., and simply acts as a vacuum breaker to allow gravity flow of liquid disinfectant D out of tank 96. With valve 102 turned to the open position it will be seen that liquid disinfectant D will flow by gravity into cartridge 72. As well, valve 102 can be used to throttle flow of liquid disinfectant into the cartridge 72.

In lieu of the arrangement shown in FIG. 2, it will be appreciated that tank 96 could be dispensed with and that liquid disinfectant could be poured directly into cartridge 72 by removal of cap 70. As depicted in FIG. 2, clarified wastewater W flows in the direction of arrow A from tank 52 through T-fitting 56 into tank 64. Flowing wastewater W impacts paddle 88 and moves paddle 88 in the direction of arrow B, i.e., generally axially and upwardly. As seen hereafter, this motion of paddle 88 will open valve 86 allowing disinfectant D to flow through valve 86 and into the flowing wastewater W. While as shown in the drawings, paddle 88 generally comprises a substantially flat blade portion connected to a stem, rod, or the like which in turn is connected to a movable valve member of a suitable valve assembly, it is to be understood that the blade portion of the paddle 88 can take many shapes, the only proviso being that it has a surface area which when impacted by sufficient flowing water is sufficiently large to move the paddle 88 in a desired direction for a desired distance, e.g., enough to open valve 86. It will also be recognized that the width of the paddle can vary substantially, as desired, so as to occupy as much or little of the cross-sectional area of the ID of leg 61 of T-fitting 66. Obviously, paddle 88 can be shaped and sized such that it will move freely in the conduit, fitting, or the like in which it is disposed.

Figure 5:
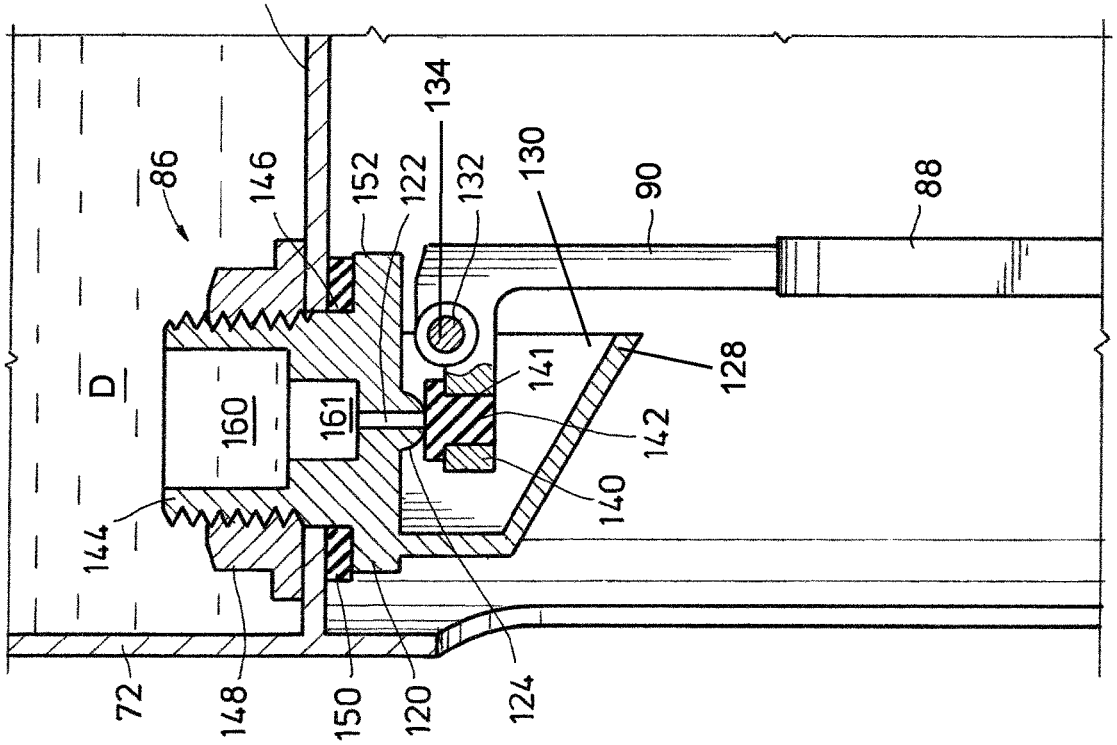
FIG. 5 is a view similar to FIG. 4 but showing the valve in the open position.

Turning now to FIGS. 4 and 5, one form of valve assembly 86 comprises a body 120 having a flow path 122, 160, and 161 therethrough. A downwardly extending nipple 124 on body 120 forms a valve seat (see FIG. 5) through which portion 122 of the flowpath extends. Housing 120 further includes a chute 128 having a mouth 130. Mounted in chute 128 is an axle or pin 132. Paddle 88 is connected to an arm 90 having a laterally extending finger or valve member 140. Formed in finger 140 is a bore 134 in which is journaled pin 132. Finger 140 has a bore 141 in which is received a resilient valve seal 142. It will be understood that valve assemblies useful in the present invention can have a resilient valve seal which can be sealingly engaged when the valve member is in the closed position. In this regard, the valve seal can be carried by the movable valve member or alternatively can be positioned on the valve body, e.g., generally in surrounding relationship to the outlet of the valve body.

Valve body 120 further includes a threaded shank portion 144 which extends through an opening 146 in plate 84. A nut 148 is threadedly received on threaded shank portion 146. There is an annular gasket 150 disposed between a flange portion 152 of body 120 and the underside of plate 84. It will be appreciated that as nut 148 is tightened, gasket 150 will be compressed to sealingly engage valve assembly 86 and plate 84. In the closed position, as shown in FIG. 4, liquid disinfectant D will fill flow paths 160, 161, and 122, but cannot flow out of closed valve assembly 86 since the valve member formed by finger 140 and seal 142 is operatively engaged with the valve outlet formed by flow path 122 in the valve body 120.

Turning to FIG. 5, when water W is flowing in the direction of arrow A shown in FIG. 2, paddle 88 will be moved from the position shown in FIG. 4, wherein valve assembly 86 is closed, to the position shown in FIG. 5 wherein valve assembly 86 is open. Accordingly, liquid disinfectant D will flow through flow paths 160, 161, and 122 and be dispensed via chute 128 into the flowing wastewater W. As will be apparent, if no wastewater is flowing, paddle 88 moves, under the force of gravity, to the closed position shown in FIG. 4 with valve seat 124 engaged by valve seal 142 and accordingly no liquid disinfectant can flow through valve assembly 86. In other words, the valve assembly 86 is in the normally closed position by the force of gravity, e.g., arm 90 and paddle 88 are of sufficient weight so as to be pivoted by gravity to the generally vertical position, shown in FIG. 4 forcing valve seal 142 into engagement with valve seat 124. However, once flow of wastewater W commences, paddle 88, acting as an actuator moves valve seal 142 out of engagement with valve seat 124 allowing a flow of disinfectant D as described above.

As seen in FIG. 3, when viewed in elevation, paddle 88 can have a curved upper and lower edges to generally conform to the shape of window 78 and the contour of T-fitting 56. However, as described above, it will be understood that paddle 88 could take virtually any shape so long as flowing wastewater W acting on the paddle 88 results in the movement of paddle 88 and thus movement of the valve element 142 out of seating/sealing engagement with the valve seat 124, allowing flow of liquid disinfectant through the valve assembly 86.

It will be appreciated that portion 122 of the flow path could be of any desired size to allow slower or faster flow of disinfectant D out of the cartridge 72 and into the flowing wastewater W. Indeed, valve sizes can be varied to accommodate the desired degree of flow of disinfectant.

As seen, in one embodiment, disinfecting apparatus shown in FIGS. 2-5 requires no electrical conductivity, and has a valve assembly which is actuated by flowing water and is in a normally closed position in the absence of flowing water. Further, the amount of liquid disinfectant added can be made a function of how much wastewater is flowing by varying the valve size, paddle size, paddle weight, etc. In other words, the system is self-metering.

Referring now to FIG. 6, there is shown a variation of the embodiment shown in FIGS. 4 and 5 wherein the valve assembly is spring loaded. Valve body 220 has a passageway therethrough comprising passageway portions 260, 261, and 262. Valve body 220 has a laterally extending flange portion 221 in which is formed a blind bore 223.

Paddle 88 is connected by an arm 236 to a valve member shown generally as 237. Valve member 237 comprises a knuckle portion 238 pivotally mounted to body 220 via a pin or shaft 249. There is a resilient valve seal 242 received in a bore 243 formed in knuckle portion 238. Knuckle portion 238 has blind bore 250, bore 250 being generally in register with bore 221 in the position shown in FIG. 6, e.g., when valve assembly 286 is in the open position. Received in the blind bores 221 and 250 is a compression spring 251. As depicted in FIG. 6, wastewater is flowing through a suitable conduit in which is received paddle 88. Accordingly, paddle 88 is moved into the position shown in FIG. 6, which compresses spring 251 and pivots valve member 237 such that valve seal 242 is disengaged from the valve seat 224 formed on valve body 220. However, it will be appreciated that when wastewater is no long flowing, paddle 88 will be forced generally in the direction of arrow B, forcing the knuckle portion 238 to pivot about pivot pin 249 and engage resilient valve seal 242 with valve seat 224. Accordingly, flow of disinfectant through valve body 220 will be terminated.

Figure 8:
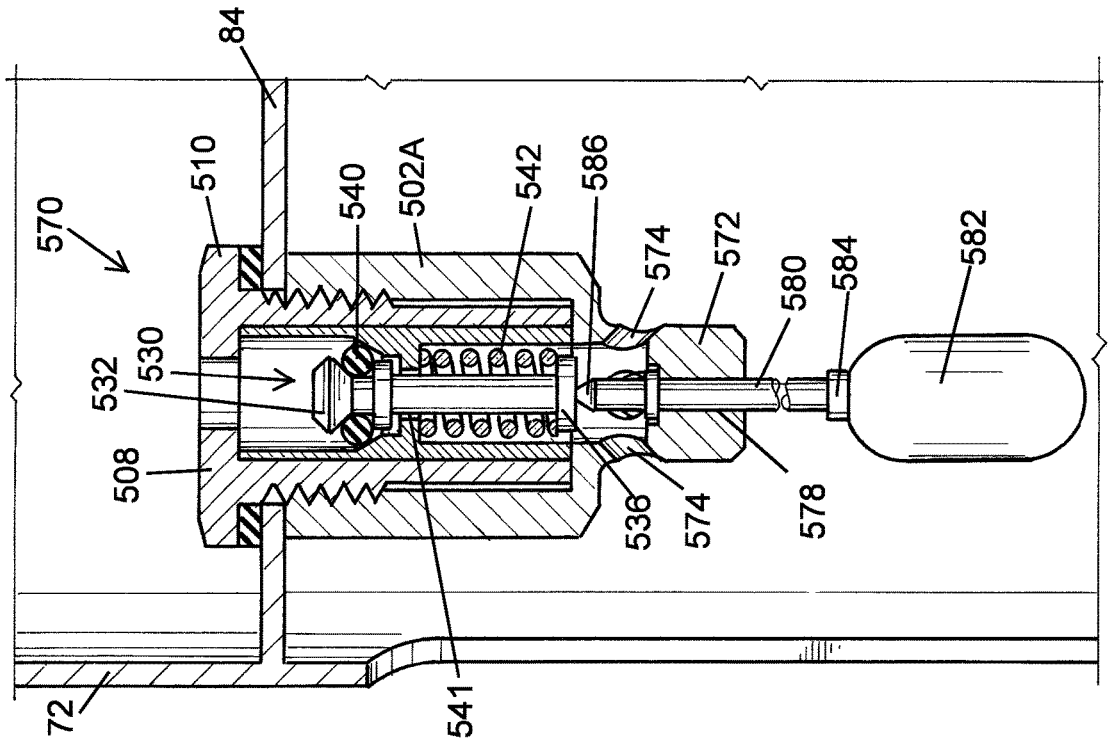
FIG. 8 is a view similar to FIG. 7 showing another embodiment of the valve assembly employing a spring loaded poppet valve.
Figure 7:
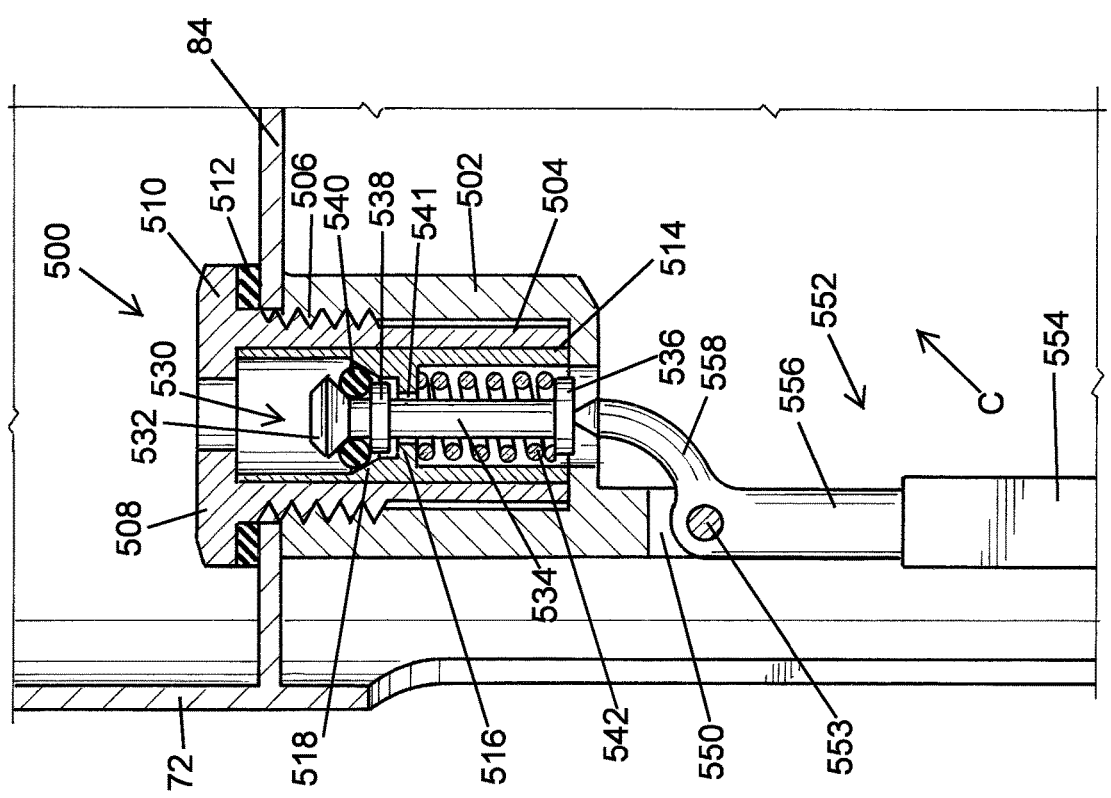
FIG. 7 is a view similar to FIG. 4, but showing a spring loaded poppet valve assembly.

Turning now to FIGS. 7 and 8, there is shown another valve assembly for use in the apparatus and method of the present invention. In general, the valve assembly shown in FIGS. 7 and 8 is one form of a relief valve, commonly referred to as a "mushroom valve" adapted to comprise a valve assembly useful in the apparatus and method of the present invention. The valve assembly, shown generally as 500 comprises a valve body 502 having a generally axially extending flowpath 541 therethrough and which defines a generally cylindrical internal chamber 504, there being female threads 506 formed proximal the upper end of body 502. A valve cartridge 508 is threadedly received in chamber 504, valve cartridge 508 having an annular flange portion 510 which engages a resilient gasket 512, gasket 512 being positioned between flange 510 and plate 84, such that as valve cartridge 508 is threaded into chamber 504, annular gasket 512 is compressed and forms a seal between valve cartridge 508 and plate 84.

Disposed internally of valve cartridge 508 is a valve sleeve 514, sleeve 514 having a radially inwardly extending annular formation forming a ledge 516, and an annular, tapered seating surface 518. Received in sleeve 514 is a poppet shown generally as 530. Poppet 530 has a typical mushroom-shaped head 532 which is connected to a valve stem 534, valve stem 534 terminating at its lower end in a circular valve stop or keeper plate 536. Poppet 530 also includes a radially outwardly projecting flange 538, an annular seal/o-ring 540 being carried in the recess between poppet head 532 and flange 538. A compression spring 542 is disposed between spring keeper plate 536 and ledge 516. In the position shown in FIG. 7, spring 542 biases poppet 530 in a downward direction such that o-ring 540 sealingly engages annular seating surface 518 whereby flow through vertical passageway 541 is prevented. In other words, in the closed position, o-ring 540 is compressed between poppet head 532 and seating surface 518.

Valve body 502 has a downwardly projecting leg 550 to which is pivotally attached by pin 553 an actuator shown generally 552 comprising a blade or paddle portion 554, an arm 556 and a finger 558 which, when the valve is in the closed position as shown in FIG. 7 is proximate valve keeper plate 536. Thus, in the condition shown in FIG. 7, there would be no wastewater flowing in a conduit in which paddle 554 is disposed and accordingly no flow of liquid disinfectant would pass through flow path 541 of valve assembly 500. However, once flow of wastewater commenced, paddle 554 would be moved in the direction of arrow C which would cause operative engagement between finger 558 and valve keeper plate 536 forcing poppet 530 upwardly against the force of spring 542 and allowing disinfectant to flow through flow path 541. In effect, with water flowing and actuating paddle 554, o-ring 540 will be moved upwardly out of sealing engagement with seating surface 518, opening the generally vertically extending flow path 541 through valve assembly 500.

Referring now to FIG. 8, the poppet valve shown generally as 570 differs from the poppet valve 500 in the fact that body 502A has a downwardly projecting bulbous formation 572 having a plurality of circumferentially spaced ports 574 in open communication with the vertical flowpath 541 through valve 570. Bulbous formation 572 also has a throughbore 578 which forms a guide for a stem 580 which is connected to a float 582. Typically, stem 580 would be threaded into a suitable fitting 584 attached to float 582. Stem 580, as seen in FIG. 8, has an upper end 586 which is proximate valve keeper plate 536. In the position shown in FIG. 8, valve 570 is in the closed position. However, when water flowing in the conduit in which float 582 is disposed is at a level sufficient to cause float 582 to move upwardly, the upper end 586 of stem 580 will operatively engage valve keeper plate 536 forcing it upwardly, compressing spring 542 and forcing o-ring 540 out of engagement with seating surface 518, thereby allowing flow of liquid disinfectant through the generally vertical flowpath 541, through valve 570. Once the level of wastewater flowing through the conduit has dropped such that float 582 is not buoyed upwardly, spring 542 will close valve 570.

Figure 10:
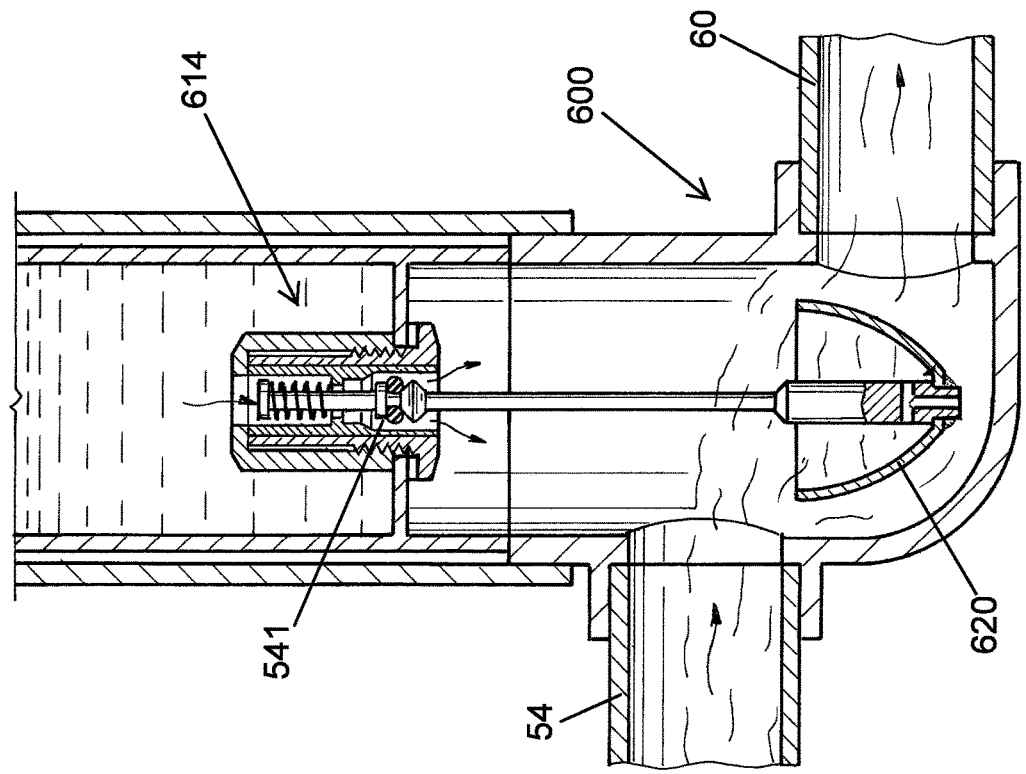
FIG. 10 is a view similar to FIG. 9 showing operation of the valve assembly under the influence of flowing wastewater.
Figure 9:
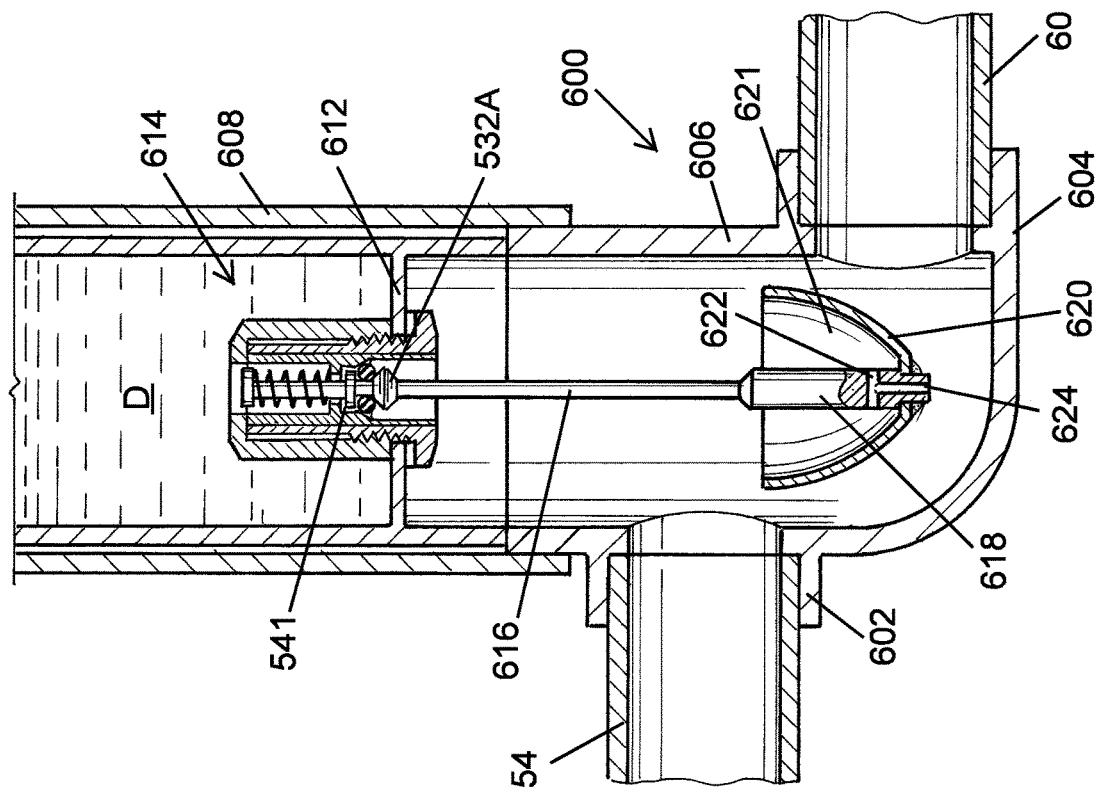
FIG. 9 is an elevational view, partly in section, showing the valve assembly used in the embodiment of FIG. 7 in another embodiment of the present invention.

Turning now to FIGS. 9 and 10, there is shown yet another embodiment of the disinfecting apparatus of the present invention. The embodiment depicted in FIGS. 9 and 10 can employ an offset T-fitting shown generally as 600 having a first horizontal leg 602, a second horizontal leg 604, legs 602 and 604, when installed, being at different elevations as shown in FIG. 9. Thus, in the embodiment shown in FIGS. 9 and 10, leg 602, when the apparatus is installed, will be at a higher elevation than leg 604. Connected to leg 602 is conduit 54, while conduit 60 is connected to leg 604. A generally vertically extending riser 608 is connected to leg 606. As will be understood in the general case, riser 608 will extend slightly above grade if the system were installed such that pipes 54 and 60 were buried.

Received in riser 608 is a cartridge 610 comprising a tubular member, cartridge 610 having a plate 612 disposed internally thereof, plate 612 forming a support for a poppet valve shown generally as 614. Poppet valve 614 is, for all intents and purposes, identical to poppet valves 500 and 570 shown in FIGS. 7 and 8, with the exception that in the apparatus shown in FIGS. 9 and 10, the valve 516 is mounted "upside down" from the mounting position shown with respect to the poppet valves of FIGS. 7 and 8. Connected to the mushroom-shaped head 532A of poppet valve 614 is a rod 616 which is connected to the hub 618 of a cup-shaped actuator element 620 having interior cavity 621. Hub 618 has a generally laterally extending passageway 622 in open communication with the interior cavity 621 of cup-shaped actuator element 620 and a generally longitudinally extending passageway 624 which is in open communication with the offset T-fitting 600 and the lateral passageway 622. As seen in FIG. 9, with no flow through T-fitting 600, liquid disinfectant D in cartridge 610 cannot flow through valve 614.

Reference is now made to FIG. 10 which shows the action of the valve assembly/actuator used in the embodiment of FIGS. 9 and 10. Wastewater flowing through conduit 54 dumps into offset T-fitting 600 filling cavity 621 formed by cup-shaped actuator element 620. As cup-shaped actuator element 620 fills, the increased weight pulls down on rod 616 which disengages the o-ring 540 from seating surface 518, resulting in flow of liquid disinfectant D out of cartridge 610 through the flow path 541 in valve 614 and into the wastewater flowing through offset T-fitting 600. So long as cavity 621 is filled with wastewater, valve 614 will remain in the open position. However, as flow of wastewater through conduits 54, T-fitting 600, and conduit 60 cease, wastewater in cavity 621 will slowly drain out of cavity 621 via passageway 622 and 624 and slowly allow valve 614 to again move to the closed position.

The embodiment of FIGS. 9 and 10 is desirable if for some reason there are offset flow lines or conduits such as conduits 54 and 60. In addition, the use of an actuator with a cup-shaped actuator element such as 620 with passages 622 and 624 allows a controlled closing of valve 614.

Figure 11A:
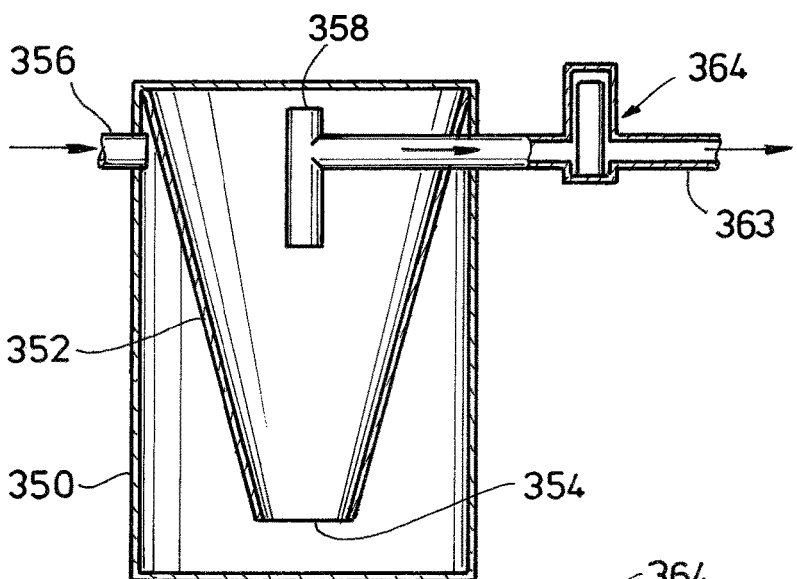
FIGS. 11A-11C are elevational views, partly in section, showing further embodiments of the disinfecting apparatus of the present invention
Figure 11B:
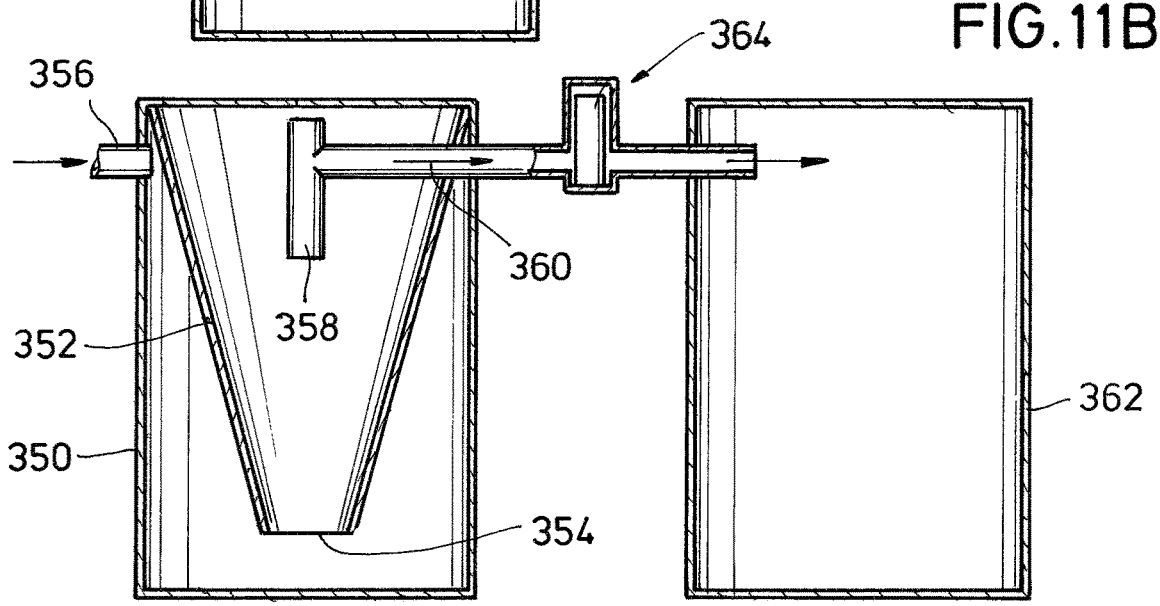
Figure 11C:
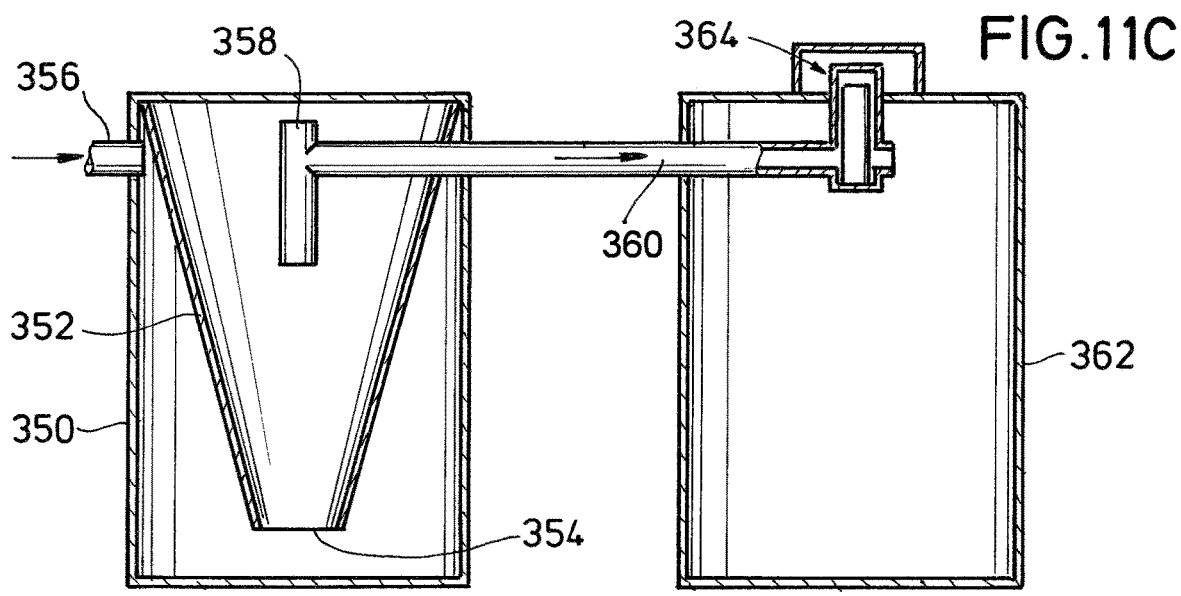

Turning now to FIGS. 11A-11C, there are shown specific embodiments of the liquid disinfectant apparatus of the present invention which can be used in an above ground system. Turning first to FIG. 11B, a clarifier/aerobic tank 350 commonly used in aerobic wastewater treatment systems has an inverted truncated partition 352 having an open mouth 354. Wastewater entering aerobic clarifier 350 via inlet 356 is aerated in a well-known manner, substantially clarified water passing via gravity overflow 358 and pipe 360 into a pump tank or the like 362. Disposed in line 360 is a disinfecting apparatus 364 according to the present invention as for example the disinfecting apparatus shown in FIGS. 2-5. It will be understood that the operation of disinfecting apparatus 364 will be the same as described above with respect to the other embodiments in that water flowing from tank 350 to tank 362 through disinfecting apparatus 364 will cause automatic dispensing of liquid disinfectant into the flowing wastewater stream as it passes from tank 350 to tank 362.

Turning to FIG. 11C, the embodiment shown therein is substantially the same as that shown in FIG. 11B with the exception that the disinfecting apparatus 364 shown as being disposed in tank 362 close to the outlet of conduit 360. As described above with respect to the embodiment of FIG. 11B, wastewater flowing through pipe 360 and gravitationally dumping into tank 362 will activate disinfecting apparatus 364 in a manner described above with respect to many of the other embodiments ensuring that the wastewater entering pump tank 362 is properly disinfected for disposal, e.g., irrigation systems, discharge to streams, or the like.

Referring now to FIG. 11A, there is shown the embodiment depicted in FIG. 11B, with the exception that tank 362 have been removed. In the embodiment shown in FIG. 11A, the disinfected water leaving chlorinator 364 is discharged through a pipe 363 into the environment, a scenario which is permissible under certain conditions.

Referring now to FIG. 12 there is shown a disinfectant apparatus for use with liquid disinfectant which can be used in an environment such as disclosed in FIGS. 1-4 or could be used above ground, e.g., between two tanks. As shown, the disinfecting apparatus 153 in FIG. 12 is disposed in a generally vertically extending riser 155 connected to a T-fitting 154. The disinfecting apparatus 153 comprises a tube or pipe 156 which could be virtually any diameter but generally is in the range of 0.5-2" in diameter. The tube 156 is connected at the lower end to a valve assembly shown generally as 158 similar in design and operation to the valve assemblies described above with respect to the FIGS. 2-5, but which can be of any suitable design wherein when disposed in proper orientation it is gravity biased to the closed position. Valve assembly 158 is supported on plate 157 in riser 155. Like the apparatus shown in FIGS. 4 and 5 above, valve assembly 158 has a movable valve element which is connected by an arm 162 to a paddle 164. Tube 156 extends through an opening in a cap 166 on disposed on riser 155 and is connected thereto via a threaded interlock between external threads on tube 156 and a threaded nut 168. There is a flow line 170 connected to a reservoir 172 of a liquid disinfectant, the reservoir having a vent 173 which can include a control valve as shown to serve as a vacuum breaker.

There is an in-line valve 174 in line 170. Valve 174 can be of many various types, including a small ball valve, a lure valve, a roller clamp valve, etc. In general, any, preferably adjustable, flow valve can be employed as valve 174.

As shown, feed tube 170 is connected in a well-known manner adjacent or near the top of tube 156 whereby liquid disinfectant can flow into tube 156. Thus, disinfectant from reservoir 172 flowing through feed tube 170 simply fills tube 156 to the desired degree. This effectively makes tube 156 an intermediate reservoir of liquid disinfectant which could be discharged by the opening of valve assembly 158. Additionally, it should be recognized that the volume of tube 156 could be varied such that the reservoir formed by tube 156 would vary in size. Indeed, tube 156 could be used as a dosing chamber in the sense that valve 158 would be sized such that when valve assembly 158 was open, the entire contents of the dosing chamber formed by tube 156 would be discharged into the flowing stream of wastewater.

In a variation of the apparatus shown in FIG. 12, line 170 can extend through tube 156 and be connected directly to valve assembly 158. For example, with reference to FIGS. 5 and 6, line 170 would be connected directly in a suitable fashion, well known to those skilled in the art, to the inlet of flow path 160, 161, and 122 of valve body 120. It can be seen that many ways can be made to customize flow of liquid disinfectant into the flowing wastewater to achieve the desired degree of disinfection. In this regard, portion 122 of the flow path through the valve could be sized to a desired opening, the float 164 could be weighted to a desired degree to control the buoyancy, a larger or smaller valve could be used etc.

With reference to FIG. 13, it can be seen that paddle 164 has a bleed notch 165 formed in the lower end of paddle 164. The bleed notch 165 ensures that a small flow of wastewater can pass through the conduits and the T-fitting without activating paddle 164 and opening valve assembly 158. Thus, if there is a small leak or the like upstream in the system, the trickle of water will not trigger the release of liquid disinfectant.

Turning to FIG. 14, whereas in the embodiment of FIG. 12 a paddle was used, the paddle serving as an actuator in response to water flow, in the embodiment shown in FIG. 14, float 178 in connection with arm 162 also serves as an actuator since the flowing water level in T-fitting 154 rises as water flows through T-fitting 154, causing float 178 to move in the direction of arrow B, opening valve 158. Once the level of water flowing in T-fitting 154 drops below the level at which float 178 is buoyed, float 178 will return, by gravity, to the position shown in FIG. 14 and valve assembly 158 will be closed.

The embodiment shown in FIG. 15 is similar in many respects to the embodiments discussed above. Cross-fitting 180 which would be connected by suitable conduits to a source of clarified wastewater and a pump tank or the like is connected to a vertically oriented riser 182 which could be below the surface of the ground, the riser 182 being provided with a suitable head portion (not shown). Received in riser 182 is a cartridge 186. There is a generally horizontally disposed plate 194 mounted in cartridge 186. Mounted to plate 194 is an adjustable valve assembly 200 which again can be of various types including a plug valve, ball valve, etc. but which in any event can provide for adjustable flow. Valve 200 has a passageway 201 in open communication with a chamber 202 formed internally of cartridge 186 and liquid disinfectant disposed therein. Valve 200 is also in open communication with the flow path through valve assembly 204, which can be the same or similar to valve assembly 86, which in turn is connected to a paddle 206 as described above. In operation, and as discerned from the above description of the other embodiments, water flowing through T-fitting 180 will cause paddle 206 to move, opening valve 204. Liquid disinfectant D in cartridge 186 will then flow through valve 200 and valve 204 into the flowing wastewater.

The embodiment of FIG. 15, as noted above uses a cross-fitting 180. The use of a cross-fitting such as cross-fitting 180 allows a provision of a flat bottomed wall or surface such as can be formed by a cap 181 positioned in leg 182 of cross-fitting 180. Thus, as shown in FIG. 15, the bottom edge of cartridge 186 can rest on the flat wall surface formed by cap 181.

Turning now to FIGS. 16 and 17, cross-fitting 300 is connected to a vertically extending riser 302. Disposed in riser 302 is a cartridge 306 having a lower end 308 with registering upstream and downstream windows 310 and 312 respectively. Disposed in cartridge 306 is a generally horizontally disposed plate 314 on which is mounted an on-off valve 316 as described above with the respect to the other embodiments. Valve 316 has a pivoting valve element connected by an arm 318 to a float 320. Connected to the outlet leg of cross-fitting 300 is an adjustable weir 322. Adjustable weir 322 can be of any type well known to those skilled in the art, as for example those disclosed in U.S. Pat. Nos. 5,154,353 and 5,680,989, both of which are incorporated herein by reference for all purposes. In lieu of an adjustable weir, so-called levelers can be employed. Levelers are commonly used in combination to equalize flow out of a distribution box. Non-limiting examples of such levelers are sold by Tuf-Tite Corporation under the name Speed Leveler® SL-4. It will be apparent that using adjustable weir 322, the notch opening can be varied in size thereby controlling the level of water in cross-fitting 300. This is another way in which precise control of liquid disinfectant being added to the wastewater can be achieved. Such is also the case with the levelers noted above.

It is to be understood that in additional to weirs, both fixed and adjustable, and levelers, any means of restricting downstream flow which causes a rise in the level of flowing wastewater in the lower end 308 of cartridge 306 can be used. Thus, any means by which flow through the downstream leg of cross-fitting 300 can be restricted, or for that matter, further downstream can be employed. Stated differently, any means which raises the level of wastewater in the mixing chamber formed in cross-fitting 300 can be used.

There is a liquid disinfectant reservoir 326 having an air vent 330, a first line 328 from reservoir 326 being connected via a fitting 332 to cartridge or pipe 306. An adjustable vent or vacuum breaker 330 can be used to control the flow of liquid disinfectant out of reservoir 326 through line 328 and into tube 306. It will be recognized that in virtually all the embodiments discussed above, there can be a primary reservoir of liquid disinfectant formed, e.g., by a pipe or cartridge 306 and/or a secondary source, e.g., formed by reservoir 326.

Referring now to FIG. 18, there is shown another version of the liquid disinfectant apparatus of the present invention, received in a riser which can extend below ground. The chlorinator, shown generally as 400, is in many respects structurally the same as the prior art tablet chlorinators and, accordingly, like many of the embodiments described above, can be retro-fitted in an assembly previously using a tablet chlorinator. Thus, there is a cross-fitting 402 having an inlet leg 404, an outlet leg 406, a vertically upwardly extending top leg 408, and a vertically downwardly extending leg 409 which cooperate to define an internal contacting or mixing chamber. It will be understood that wastewater enters cross-fitting 402 through inlet 404 and is discharged to a pump tank or the like through outlet 406.

Chlorinator 400 comprises an elongate tube or cartridge 410 having an upper end (not shown) which, when installed, is above or near ground level. Tube 410, at its lower end 414, is provided with registering passageways 416, 417 through which influent from inlet 404 can flow through into the contacting chamber and subsequently through outlet 406. Tube 410 is received in a buried riser 418 which has a head assembly (not shown) and has a bottom plate 411.

The leg 408 of cross-fitting 402, as is well known to those skilled in the art, is cylindrical. There is a circular plate 424 disposed generally horizontally therein. A valve seat 426 is formed on plate 424, there being an aperture therethrough. There is a rod 428 connected at its lower end to a float 430, rod 428 extending through the aperture in valve seat 426 and being connected on its upper end to a valve member 434 which seats on valve seat 426 formed on plate 424.

To keep float 430 centered, there are a plurality of vertically upwardly extending, circumferentially spaced guide rods 413 attached to a bottom wall 411 of tube 410. Tube 410 will be filled to the desired level with a suitable liquid disinfectant, e.g., bleach. It will be understood that in the embodiment shown in FIG. 18, there can also be an auxiliary reservoir of liquid disinfectant connected to tube 410. With no water flowing through cross-fitting 402, float 430 will remain in its lowermost position causing valve element 434 to seal by gravity against the valve seat 426 formed on plate 424. However, once there is flow through cross-fitting 402, float 430 will rise moving rod 428 upwardly, and disengaging valve element 434 from valve seat 426. This will allow open communication between the interior of the tube 410 and the mixing chamber formed in cross-fitting 402 and allow the liquid disinfectant to flow into the mixing chamber formed in cross-fitting 402. Again, the actuator formed by float 430 and rod 428 act by virtue of the flowing level of water in cross-fitting 402 to open and close the valve 434.

It will be appreciated that so long as water is flowing sufficiently to raise float 430 from its lowermost position, valve element 434 will remain in the open position and allow liquid disinfectant to flow into the mixing chamber formed in cross-fitting 402. However, once flow through cross-fitting 402 ceases or falls to a sufficiently low level such that float 430 is not buoyed, float 430 will return to its lowermost position and valve element 434 will seat, by gravity, against the valve seat 426 formed on plate 424, i.e., the valve will close.

In the discussion above of FIG. 1 regarding the prior art tablet chlorinators, reference is made to the circumferentially spaced slots 24. These circumferentially spaced slots 24 are employed to ensure that chlorine tablets disposed in the lower end of the tablet chlorinator receive as much contact as possible with the flowing wastewater stream. Obviously, in the present case such a plurality of slots is not necessary. Rather, it is only necessary that there be an upstream window or aperture and a registering downstream window or aperture in the lower portion 414 of pipe 410 to ensure the flowing wastewater moves the float 430 in a direction to open valve 434, the windows being generally coaxial with the horizontal legs of the cross-fitting 402. It will be understood however that the cartridge 30 of the prior art could be modified in accordance with the present invention.

The various embodiments discussed above show the myriad of ways flow of liquid disinfectant into the flowing wastewater can be controlled. Thus, it can be controlled at the auxiliary source of disinfectant by vacuum breakers, valves and the like. It can be controlled by a valving system disposed in the cartridge, e.g., pipe 188, which in turn can be connected to an on-off valve 204.

Referring now to FIGS. 19 and 20, there is shown another embodiment of the liquid chlorinator/disinfecting apparatus of the present invention. Chlorinator 500 differs from the embodiment shown in FIG. 18 in the valving mechanism used to introduce liquid disinfectant from the liquid disinfectant chamber formed in tube 410 into the mixing chamber formed in cross-fitting 402. To this end, there is a stand pipe 502 secured to plate 424 and extending vertically upwardly into tube 410 and in surrounding relationship to an aperture 426 in plate 424. There are a plurality of vertically and circumferentially spaced holes 504 in stand pipe 502. Connected to the upper end of rod 428 is a piston 506 which is slidable in stand pipe 502. As seen, holes 504 provide open communication between the interior of stand pipe 502 and the interior of tube 410. As seen in FIG. 20, float 430 has been lifted by the flowing liquid W in the bottom of the mixing chamber and has moved rod 428 and piston 506 upwardly to a position such that there is free flow of liquid disinfectant through the holes 504 below piston 506 into standpipe 502 through aperture 426 in plate 424 and into the mixing chamber formed in the T-fitting. It will be appreciated that if piston 506 is moved upwardly due to the presence of a greater volume/flow of water through the mixing chamber causing float 430 to rise further, more holes 504 will form open flow paths between the inside of tube 410 and the interior of stand pipe 502 meaning that more liquid disinfectant will flow into the mixing chamber below.

It will also be appreciated that if there is no water in the mixing chamber, float 430 will move by gravity to its lowermost position and will hold piston 506 which comprises a valve element, in sealing engagement with a seating surface formed circumferentially around aperture 426 in plate 424, i.e., the valve will be closed.

The embodiment of the present invention shown in FIGS. 19 and 20 is one of many ways to use a valving system which can be on-off or can be throttling. In this regard, when the valve element 506 has moved out of sealing engagement with the seat formed on plate 424, flow of liquid disinfectant out of cartridge 410 will commence. Conversely, when piston/valve element 506 seats against plate 424, there will be no flow. Thus, in that respect the valve is an on-off valve. However, the valve can also be used to throttle or control flow at some rate in between fully closed and fully open in the sense that more or less liquid disinfectant is admitted by moving piston 506 vertically in cartridge 410.

Figure 21:
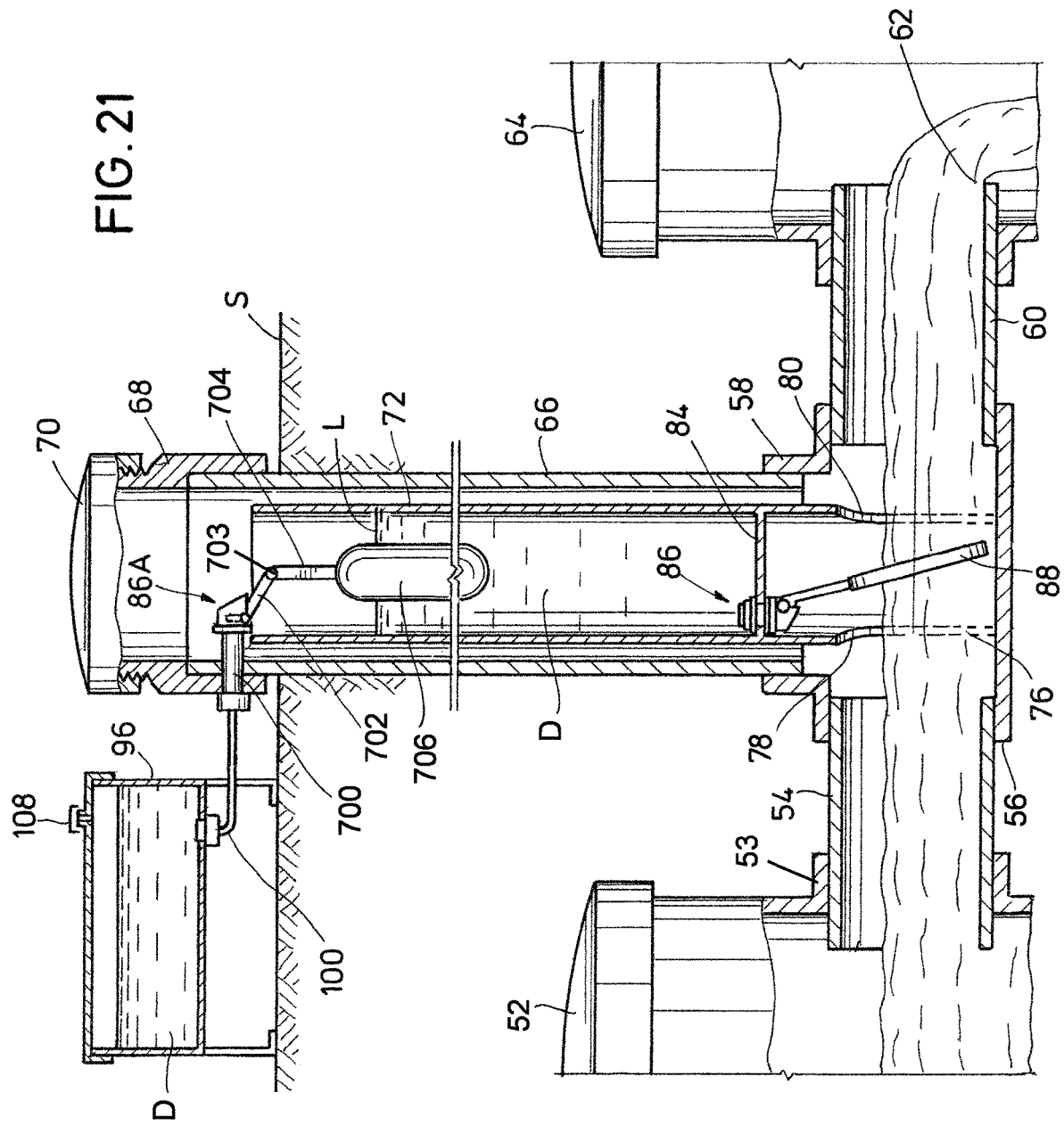
FIG. 21 is a view similar to FIG. 2 showing another embodiment of the present invention.

Turning now to FIG. 21, there is shown the embodiment depicted in FIG. 2 with the addition of an assembly to automatically refill and maintain the level of liquid disinfectant in cartridge 72 at a predetermined level. A tubular fitting 700 extends through fitting 68 and is connected at one end to outlet line 100 and on the other end to valve 86A. Valve 86A is substantially the same as valve 86 with the exception of its orientation. Although valve 86A can be of many types, it is substantially as shown with respect to FIGS. 4 and 5. The movable valve element of valve 86A is connected to an arm 702 which in turn is pivotally connected via pivot pin 703 to a link 704. In the position shown in FIG. 21, valve 86A is closed and float 706 connected to link 704 is in its uppermost position. As the level of liquid disinfectant 98 in cartridge 72 falls below the level L depicted in FIG. 21, float 706 will move downwardly with link 704 moving arm 702 downwardly and opening the movable valve element of valve 86A. The unique linkage comprised of link 704, pivot pin 703, and arm 702 of valve assembly 86A ensures that float 706 moves almost vertically downwardly so as to not engage the side walls of cartridge 72 which would hinder downward movement of float 706.

In any event, as liquid disinfectant d flows out of cartridge 72, liquid disinfectant D from reservoir 96 will flow into cartridge 72 until the level is raised sufficiently such that float 706 rises and closes movable valve element 140 (see FIG. 4).

It will be recognized that although valves 86 and 86A could be identical in use and when properly oriented, valve 86 is maintained in a normally closed position by gravity whereas valve 86A is maintained in a normally closed position by the buoyancy of float 706 floating in liquid disinfectant D which forces the movable valve element into engagement with the valve seat 124 (see FIG. 4).

The valve, e.g., valve 86, which is used to dispense liquid disinfectant into the flowing stream of wastewater can comprise any valve or valve assembly wherein, when positioned relative to a conduit through which wastewater to be treated is flowing, is biased in the closed position, e.g., by the force of gravity, a spring, etc. and is opened by any actuator or mechanism responsive to the level and/or flow of wastewater to allow flow, by gravity, of the liquid disinfectant into the wastewater in the conduit.

As noted above, one of the distinct advantages of the disinfecting apparatus of the present invention is that it requires no electrical connectivity to function. This feature is even carried through in the embodiment of FIG. 21, where the level of liquid disinfectant in cartridge 72 is controlled at a desired level without the use of any electrical connections. It is a distinct feature of this system that the laws of nature, without the aid of electrical power are used to provide an almost automatic liquid disinfecting system which not only automatically disinfects in response to flowing wastewater, but likewise can maintain a desired volume of liquid disinfectant in an intermediate reservoir which occurs, albeit indirectly, in response to flowing wastewater as depicted by the embodiment of FIG. 21.

As will be appreciated from the above description and drawings, the disinfecting apparatus of the present invention provides a number of advantages:

it replaces relatively expensive chlorine tablets with inexpensive bleach;
it relies on gravity flow for introduction of liquid disinfectant into the wastewater;
it can be retrofitted into an existing tablet chlorinating system;
it uses level and/or flow of wastewater in a generally horizontal disposed conduit to actuate a dispensing valve;
it requires no electrical connectivity for operation;
it does not depend on nor require pumps or other mechanical devices to pressurize, move, or compress a fluid;
the amount of liquid disinfectant introduced into the flowing wastewater can be controlled by any number of ways outlined above to optimize the amount of liquid disinfectant introduced into the wastewater;
it can include a system which automatically maintains a desired amount of liquid disinfectant in an intermediate reservoir without the use of any electrical connections.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An apparatus for dispersing liquid disinfectant into a conduit for flowing wastewater comprising:
    a support;
    a valve assembly comprising:
        a valve body carried by said support, said valve body having an inlet and an outlet, said inlet being adapted to be connected to a gravity flow source of liquid disinfectant,
        a movable valve member, said valve member being biased to operatively engage said valve outlet and maintain said valve assembly in a normally closed position;
        an actuator operatively connected to said valve member and operably responsive to at least one of flow or level of wastewater in said conduit to move said valve member from said normally closed position to an open position, said apparatus requiring no electrical connectivity for operation.

2. The apparatus of claim 1, wherein said valve member is gravity biased.

3. The apparatus of claim 1, wherein said valve member is spring biased.

4. The apparatus of claim 3, wherein said valve assembly comprises a check valve.

5. The apparatus of claim 4, wherein said check valve comprises a poppet check valve.

6. The apparatus of claim 1, wherein said actuator comprises a blade having a stem attached thereto, said stem being connected to said valve member, said blade being positionable in said conduit.

7. The apparatus of claim 1, wherein said actuator comprises a float having a stem attached thereto, said stem being connected to said valve member, said float being positionable in said conduit.

8. The apparatus of claim 1, further comprising:
    a tubular member having a first upper end and a second lower end, said support being mounted in said tubular member, said second, lower end of said tubular member being positionable in said conduit.

9. The apparatus of claim 8, wherein said support comprises a partition disposed in said tubular member, a chamber being formed between said partition and said first upper end of said tubular member.

10. The apparatus of claim 9, further comprising:
    a fill valve having a movable fill valve element movable between an open and a closed position and having a fill valve inlet and a fill valve outlet, said fill valve inlet being connected to a liquid disinfectant reservoir, said fill valve outlet being in open communication with said chamber, said fill valve being operative to permit gravity flow of liquid disinfectant from said reservoir into said chamber when in the open position, said movable fill valve element being connected to a float, said float being operable in response to the level of liquid disinfectant in said chamber to move said movable fill valve element between open and closed positions.

11. The apparatus of claim 10, wherein said float is connected to said movable fill valve element by a pivoting linkage.

12. The apparatus of claim 1, further comprising:
    a first vessel for holding partially treated wastewater to be disinfected, said first vessel having a first vessel outlet;
    an outlet pipe connected to said first vessel outlet and being generally horizontally disposed;
    said outlet pipe having an outlet open end and a vertically upwardly facing aperture;
    said support being mounted above said aperture, whereby said actuator extends into said outlet pipe through said aperture.

13. The apparatus of claim 12, wherein said outlet pipe has an outlet open end distal said first vessel outlet, said outlet pipe open end being in open communication with a second vessel.

14. The apparatus of claim 13, wherein the outlet open end of said outlet pipe extends into said second vessel, and said aperture is in said portion of said outlet pipe in said second vessel.

15. The apparatus of claim 12, wherein there is a second vessel, said outlet open end of said outlet pipe being in open communication with said second vessel, and said aperture is disposed in said outlet pipe between said first and second vessels.

16. In a wastewater treatment system having an outlet pipe for gravity flow of treated wastewater from a treatment plant, said outlet pipe having a first portion and a second portion, said first portion and said second portion being coaxial, a fitting disposed between said first portion and second portion and having a first leg connected to said first portion of said outlet pipe, a second leg coaxial with said first leg and connected to said second portion of said outlet pipe, said fitting having a third leg oriented generally vertically, a riser connected to said third leg and extending generally vertically upwardly, said fitting having a contacting chamber, an improvement comprising a system for dispensing liquid disinfectant into said contacting chamber, comprising:
 a support positioned in said riser;
 a valve assembly disposed in said riser, said valve assembly comprising:
  a valve body carried by said support, said valve body having an inlet and an outlet;
  a movable valve member;
  a valve seat on one of said valve body or said valve member, said valve member being biased to sealingly engage said valve seat and to maintain said valve assembly in a normally closed position
 a source of liquid disinfectant in open communication with said inlet of said valve body; and
 an actuator operatively connected to said movable valve member and positioned in said contacting chamber, said actuator being operably responsive to at least one of flow or level of wastewater in said contacting chamber to move said valve member from said normally closed position to an open position.

17. The system of claim 16, wherein said treatment plant comprises a septic tank.

18. The system of claim 16, wherein said treatment plant comprises an advanced wastewater treatment system.

19. The system of claim 18, wherein said advanced wastewater treatment system comprises an aerobic wastewater treatment system.

20. The system of claim 16, further comprising:
 a tubular member having a first upper end and a second lower end, said support being mounted in said tubular member, said second lower end of said tubular member being received in said contacting chamber.

21. The system of claim 20, wherein there is a partition disposed in said tubular member, said partition forming a chamber between said chamber and said first upper end of said tubular member, and said valve body is mounted on said partition.

22. The system of claim 21, wherein said chamber formed in said tubular member comprises a reservoir for liquid disinfectant.

23. The system of claim 22, wherein there is a supplemental reservoir of liquid disinfectant, said supplemental reservoir having a flow line for conveying liquid disinfectant from said supplemental reservoir to said reservoir in said tubular member.

24. The system of claim 1, wherein there is a feed line connected on one end to the inlet of said valve assembly, said feed line being connected on the other end to a reservoir of liquid disinfectant positioned for gravity flow from said reservoir to said inlet of said valve assembly.

25. A method for dispensing liquid disinfectant into a conduit through which partially treated wastewater can flow, said conduit having a generally vertically oriented aperture whereby a liquid disinfectant can be introduced via gravitational flow through said aperture into said conduit, comprising:
 providing a dispensing system comprising a valve assembly having a movable valve member and an actuator connected to said movable valve member, said dispensing system requiring no electrical connectivity for operation;
 supporting said valve assembly above said aperture, said valve assembly comprising a valve body having an inlet and an outlet, said inlet being adapted to be connected to a source of liquid disinfectant for gravitational flow to said inlet, said valve member being biased to operatively engage said valve outlet and maintain said valve assembly in a normally closed position;
 positioning said actuator in said conduit, said actuator being operably responsive to at least one of sufficient flow or level of wastewater in said conduit to cause said actuator to move whereby said valve member moves from said normally closed position to an open position.

26. The method of claim 25, wherein said valve member is gravity biased.

27. The method of claim 25, wherein said valve member is spring biased.

28. The method of claim 25, wherein said valve assembly comprises a check valve.

29. The method of claim 25, wherein said actuator comprises one of a blade or a float.

30. A method of converting a first wastewater treatment system utilizing chlorine tablets as a disinfectant to a second wastewater treatment system using a liquid disinfectant as a disinfectant wherein the first treatment system comprises a generally horizontally extending outlet pipe from the first wastewater treatment system to convey partially treated wastewater to a downstream location, there being a riser connected to the outlet pipe intermediate said first treatment system and said downstream location and extending generally vertically upwardly, the riser providing a receptacle, comprising:
 providing a cartridge sized to be positioned into said receptacle, said cartridge comprising a dispensing system requiring no electrical connectivity for operation, said dispensing system comprising a valve assembly having a movable valve member and an actuator connected to said movable valve member, said valve assembly being supported by said cartridge and comprising a valve body having a valve inlet adapted to be connected to a source of liquid disinfectant and a valve outlet, said valve member being biased to operatively engage said valve outlet and maintain said valve assembly in a normally closed position, said actuator being operably responsive to at least one of fluid flow or level of wastewater in which said actuator is positioned to cause said actuator to move, thereby moving said valve member;
 positioning said cartridge in said riser such that said actuator extends into said outlet pipe to the extent that a sufficient flow or level of wastewater in said outlet pipe causes said actuator to move, thereby moving said valve member from said normally closed position to an open position.

31. The method of claim 30, wherein said valve member is gravity biased.

32. The method of claim 30, wherein said valve member is spring biased.

33. The method of claim 30, wherein said valve assembly comprises a check valve.

34. The method of claim 30, wherein said actuator comprises one of a blade or a float.

35. The method of claim 30, wherein said cartridge comprises a tubular member having a first upper end and a second lower end, said second lower end being in open communication with said outlet pipe.

* * * * *